(12) United States Patent
Ackeret et al.

(10) Patent No.: US 9,365,164 B2
(45) Date of Patent: Jun. 14, 2016

(54) FASTENING DEVICE

(71) Applicant: Kinetix AG, Glarus (CH)

(72) Inventors: Peter Ackeret, Zurich (CH); Juergen Skott, Altensteig (DE)

(73) Assignee: Kinetix AG, Glarus (CH)

( * ) Notice: Subject to any disclaimer, the term of this patent is extended or adjusted under 35 U.S.C. 154(b) by 0 days.

(21) Appl. No.: 14/474,207

(22) Filed: Sep. 1, 2014

(65) Prior Publication Data

US 2014/0367430 A1 Dec. 18, 2014

Related U.S. Application Data

(62) Division of application No. 13/375,772, filed as application No. PCT/EP2010/003309 on Jun. 1, 2010, now Pat. No. 8,851,345.

(30) Foreign Application Priority Data

| Jun. 1, 2009 | (CH) | ......................................... 831/09 |
| Aug. 14, 2009 | (DE) | .......................... 10 2009 037 354 |
| Nov. 5, 2009 | (DE) | .......................... 10 2009 052 115 |
| Mar. 15, 2010 | (DE) | .......................... 10 2010 011 532 |

(51) Int. Cl.
*B60R 7/04* (2006.01)

(52) U.S. Cl.
CPC ........... *B60R 7/043* (2013.01); *Y10T 24/45524* (2015.01); *Y10T 24/45529* (2015.01)

(58) Field of Classification Search
CPC ............ B60R 7/043; B60R 2011/0017; Y10T 24/45524; Y10T 24/45529; Y10T 74/2141
USPC ................. 24/457, 459, 614, 615; 403/109.4, 403/109.8, 326, 329; 224/275, 545, 550, 224/551, 555, 927; 211/119.007; 297/188.01, 188.2; 248/118, 512, 513, 248/292.12, 292.13, 298.1, 354.7; 410/145, 410/149; 74/575, 578
See application file for complete search history.

(56) References Cited

U.S. PATENT DOCUMENTS

| 2,563,570 | A | * | 8/1951 | Williams | ............... A47C 21/00 211/184 |
| 4,587,695 | A | * | 5/1986 | Jensen | ................. A44B 11/253 24/615 |
| 6,553,637 | B1 | * | 4/2003 | Chen | .................... A44B 11/266 24/614 |
| 7,566,043 | B2 | * | 7/2009 | Chen | ....................... G06F 1/166 248/188.2 |

FOREIGN PATENT DOCUMENTS

| DE | 102005058113 A1 | * | 6/2006 | .......... B60N 2/4876 |
| DE | GB 2448958 A | * | 11/2008 | .......... B60N 2/4876 |
| JP | 2001260762 A | * | 9/2001 | |

* cited by examiner

*Primary Examiner* — Justin Larson
*Assistant Examiner* — Scott McNurlen
(74) *Attorney, Agent, or Firm* — Paul Vincent

(57) ABSTRACT

A fastening device for connecting a unit (120) to two mutually spaced headrest bars (101*b*, 101*c*) of a vehicle seat (101) has a first coupling element (102,102*a*) for receiving a second coupling element (103, 103*a*) arranged on the unit (120) as well as a first fastening element (105) arranged on the first coupling element (102,102*a*) and a second fastening element (106) movable connected to the first fastening element (105). The fastening elements are used to fasten the first coupling element (102,102*a*) to the headrest bars (101*b*, 101*c*). The first fastening element (105) and the second fastening element (106) are supported on the headrest bars (101*b*, 101*c*) and can be moved relative to each other parallel to a connecting line (100) extending approximately horizontally between the centers of the headrest bars (101*b*, 101*c*).

5 Claims, 21 Drawing Sheets

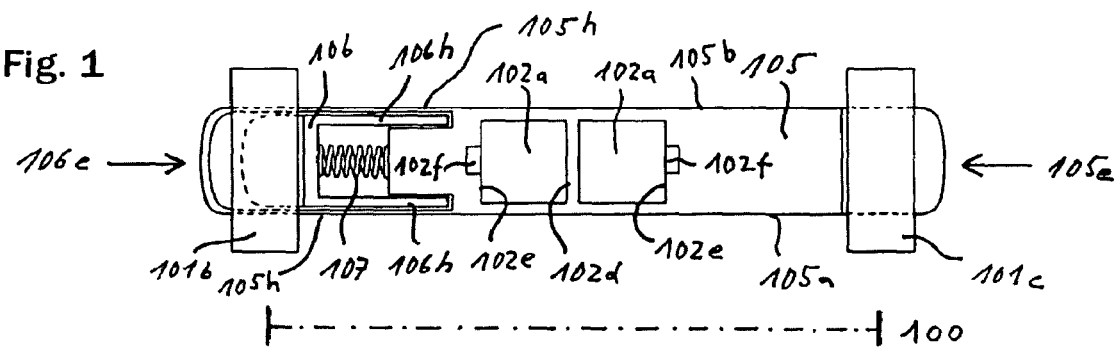
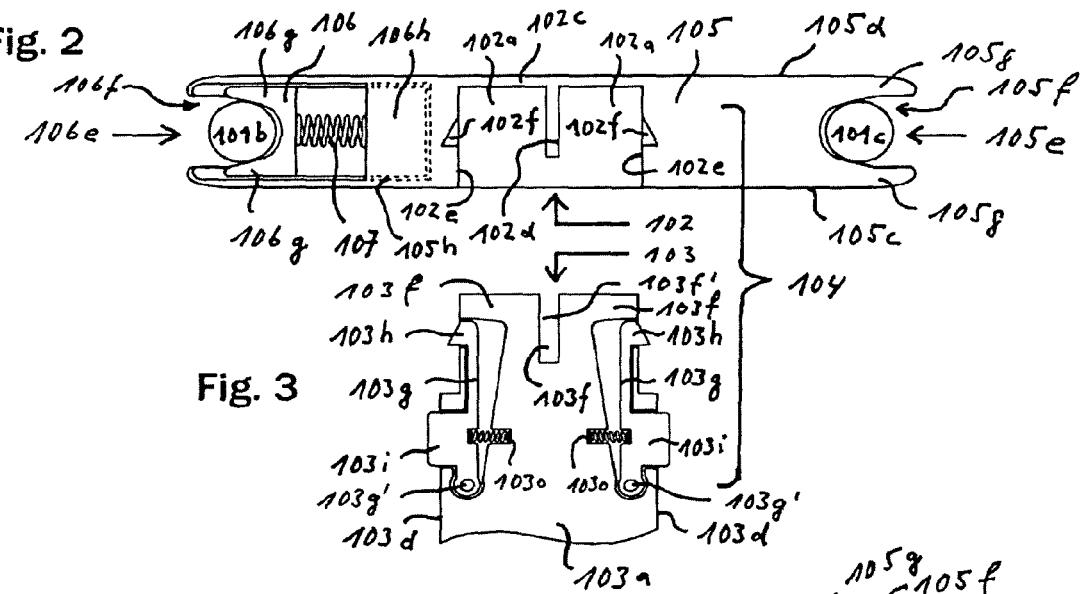
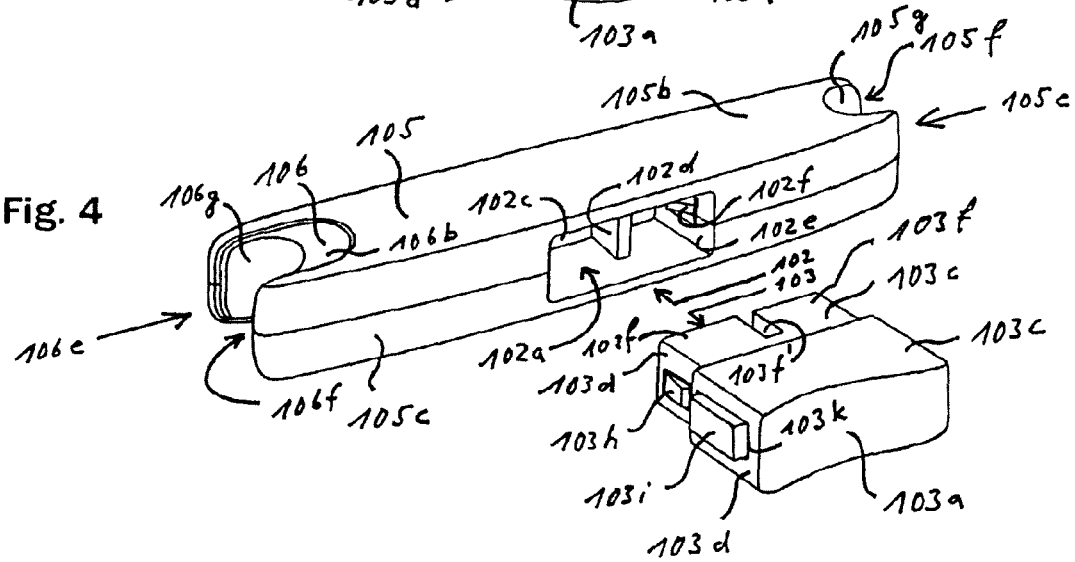

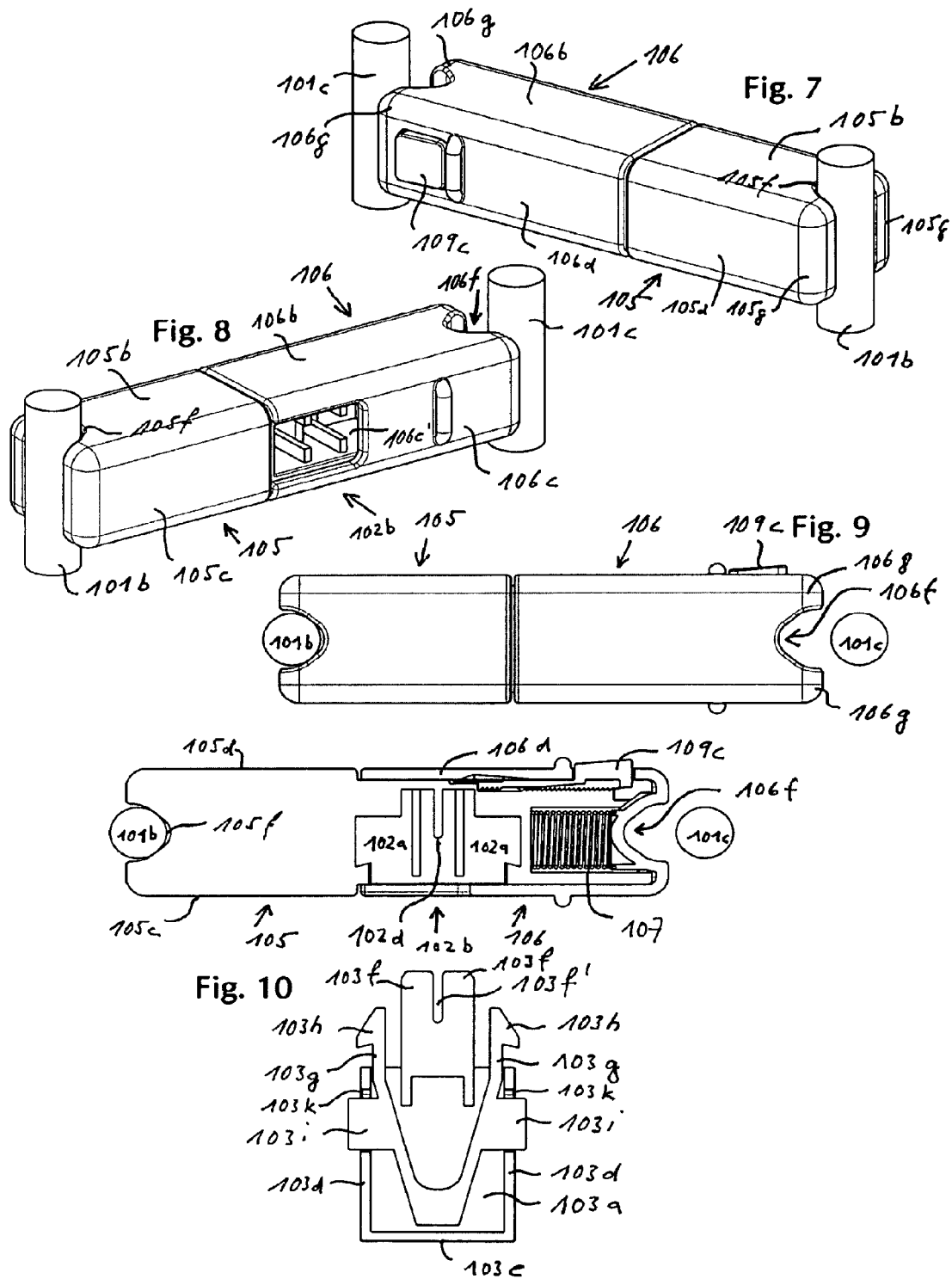

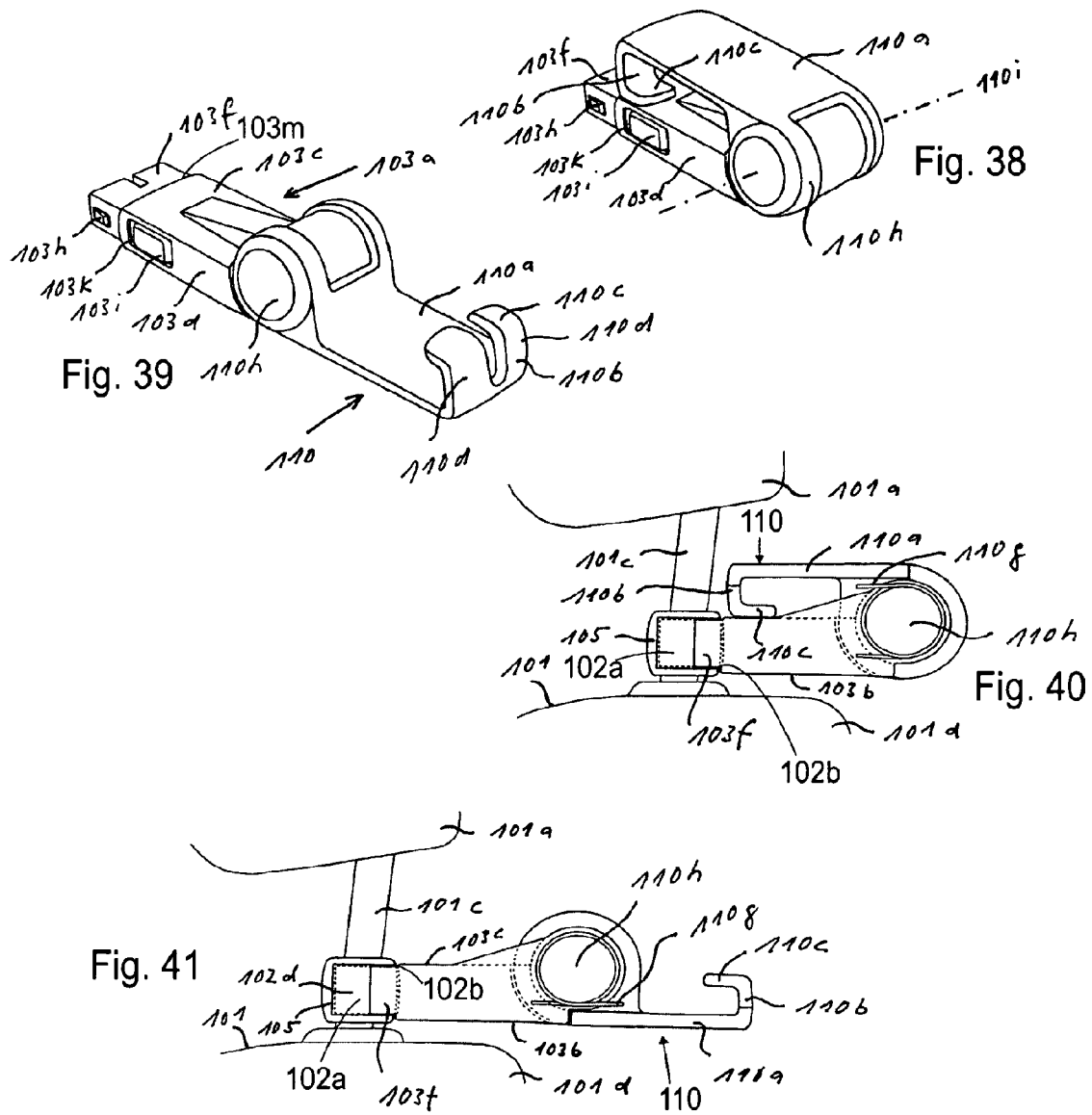

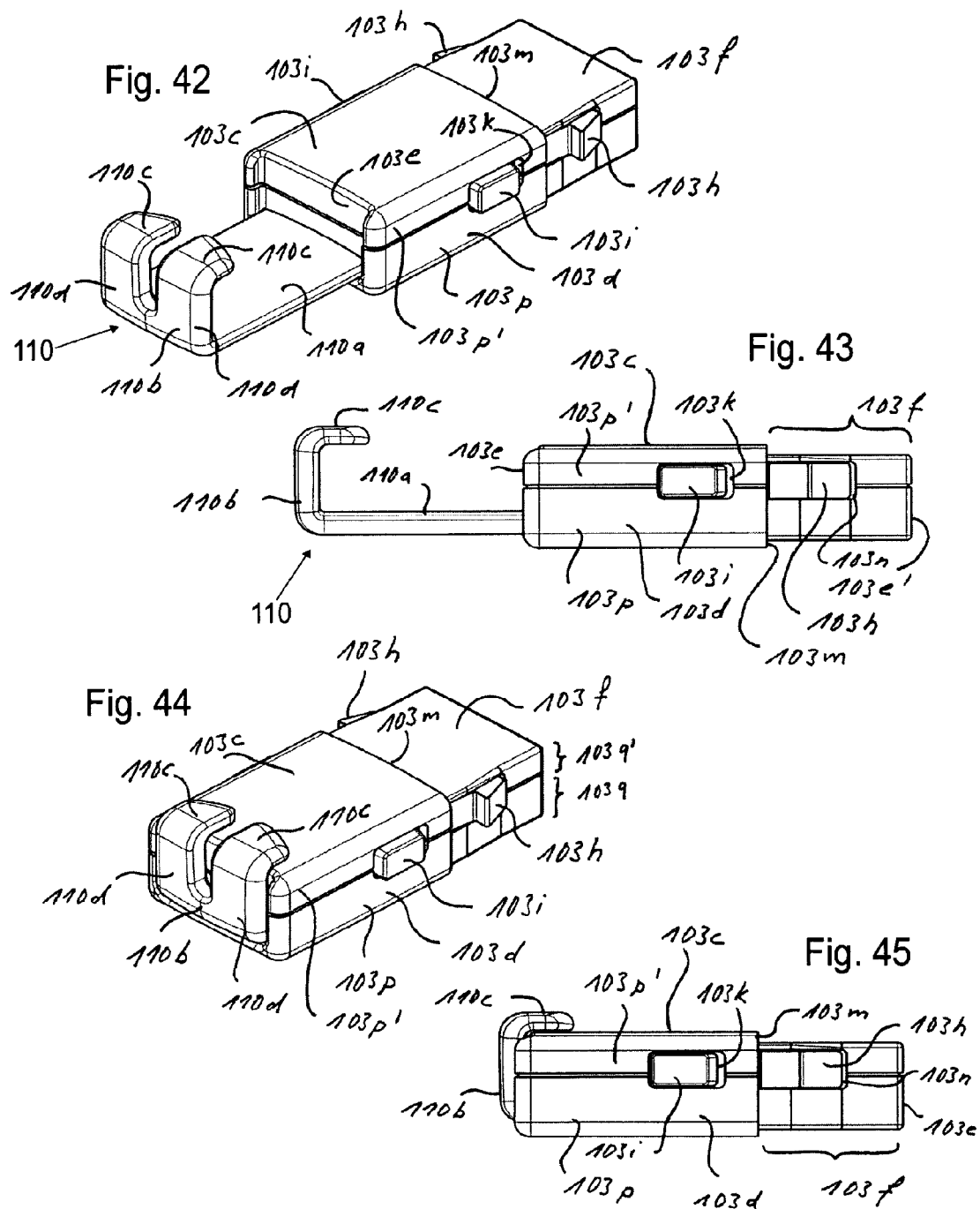

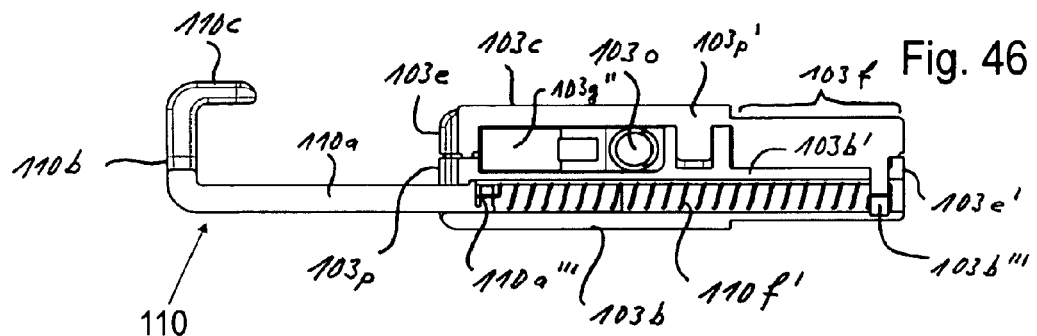
Fig. 46
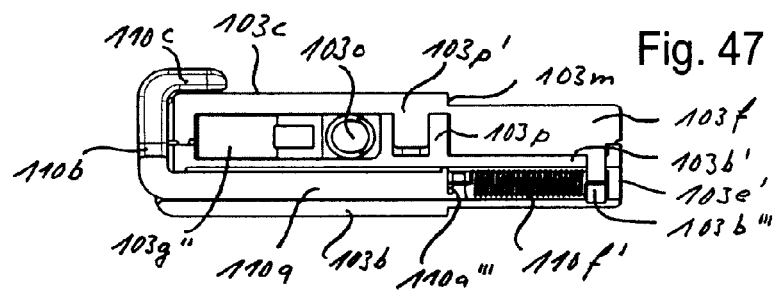
Fig. 47
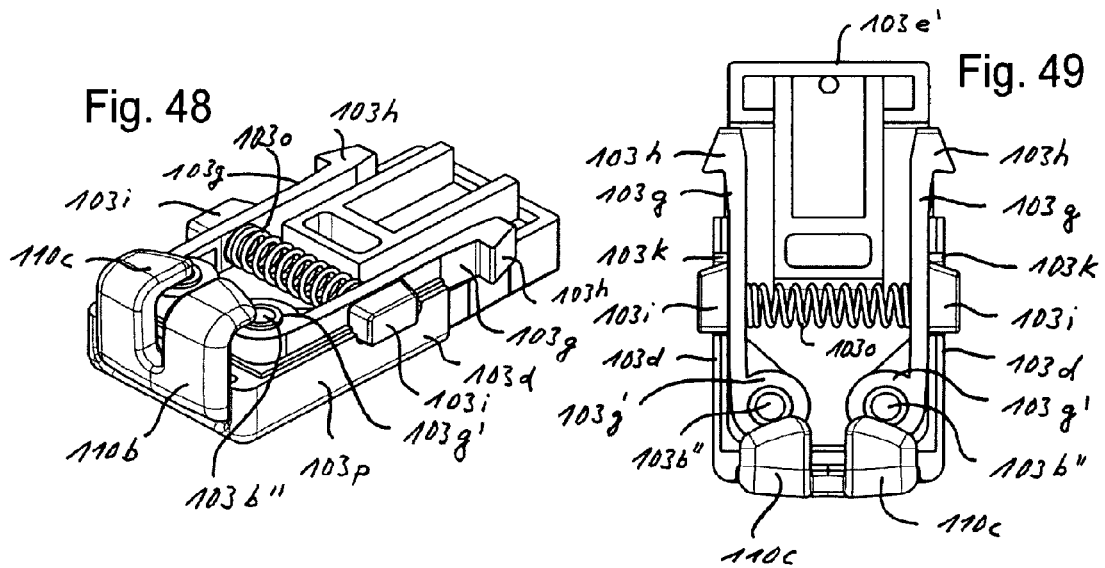
Fig. 48
Fig. 49

FASTENING DEVICE

This application is a divisional of Ser. No. 13/375,772, filed Dec. 1, 2011 as the national stage of PCT/EP2010/003309, filed Jun. 1, 2010 and claims Paris convention priority from CH 831/09 filed Jun. 1, 2009, DE 10 2009 037 354.3, filed Aug. 14, 2009, DE 10 2009 052 115.1, filed Nov. 5, 2009 and DE 10 2010 011 532.0, filed Mar. 15, 2010 the entire disclosures of which are hereby incorporated by reference into the content of the present application.

BACKGROUND OF THE INVENTION

The invention relates to a fastening unit for connecting a device to two spaced-apart headrest rods of a vehicle seat, and to a device of this type for suspending objects on a vehicle seat part, such as a backrest, headrest or a headrest mount of a vehicle seat.

A fastening unit has been described by the applicant in WO 2008 131 944 A1, to which reference is made. The described fastening unit comprises a receiving bushing which can be fastened to the headrest rods of a vehicle seat by means of fastening elements, and a plug element which is plugged into the receiving bushing and is secured by a releasable locking mechanism. The plug element is part of various modules which can thus be mounted exchangeably on the vehicle seat and can be removed and interchanged.

In order to attach the fastening unit to the headrest rods, a first and a second fastening element are placed onto two opposite sides of the headrest rods and are clamped against the headrest rods by means of a screw connection.

This results in a stable connection, thus enabling even relatively large devices, for example a folding table or a clothes-hanging device, to be stably fastened to the vehicle seat.

The headrests fitted on the vehicle seats for the driver and passenger can be adjusted in height manually or electrically and can thus be adapted individually to different user heights. This is required for improving the seat comfort, but in particular for optimum supporting of the head during rear-end collisions.

However, by means of a fastening unit mounted on the headrest rods, the height adjustability of the headrest may be restricted such that the fastening unit has to be removed from the headrest rods in order to set certain positions of the headrest, which has an adverse effect on the operating convenience of adjusting the headrest.

Fastening units which permit height adjustment of the headrest to which they are fastened are also known from practice. Generally, adapter pieces, for example in the form of short tubes, in which the headrest rods can move axially and to which the fastening units can be secured, are attached to the headrest rods or to the guides thereof in the backrest of the vehicle seat.

However, these solutions are tailored to certain diameters and spacings of the headrest rods. In addition, the mounting on the vehicle seat is associated with a considerable outlay and can only be carried out by a person skilled in the art. The headrests often for this purpose have to be completely pulled out of the mounts thereof in the backrest, which is frequently no longer possible at all in the case of modern headrests.

If the devices or fastening units are removed, the adapter pieces remaining on the headrest rods or the guides thereof frequently pose a considerable risk of injury to the passengers in the rear seats, in particular in the case of accidents.

The diameters of the headrest rods and the spacing of the headrest rods from each other vary greatly in different vehicle models. In order for it to be possible for the fastening unit to be used in a wide range of vehicle models, adaptation to different diameters and spacings of the headrest rods therefore has to be possible.

In addition, the attaching and removal of the fastening unit should be able to carried out simply and rapidly without the assistance of tools, even by amateurs.

Various countries have regulations, according to which headrests have to be able to be lowered virtually as far as the upper side of the backrests such that only a gap of small height still remains free between the lower side of the headrests and the upper side of the backrests. A fastening unit mounted on the headrest rods has to take said regulation into account and have a correspondingly low overall height.

There is often the need to secure objects carried in vehicles in such a way that they do not slide, tip over or fall off the seat during a journey. This is particularly irksome in the case of shopping bags, which are frequently used to carry a large number of different impact-sensitive foodstuffs. However, a large number of relatively small objects are also often carried around in handbags, and these can fly around and get damaged in the process or get lost under the seats if the bag tips over in the vehicle. Notebook computers in bags are also often carried in the vehicle, and these can be thrown around in the vehicle in the case of sudden driving maneuvers, possibly sustaining damage in the process or injuring passengers.

On journeys, clothes on one or more clothes hangers, often packed in garment bags, are also placed on the passenger seats or rear seats, and these can slide off the seat and fall on the floor even during slight acceleration, owing to the slippery material, and therefore the clothes can get dirty and crumpled. For this reason, clothes on clothes hangers and in garment bags are often also hung up on the grab handles arranged over the doors at the sides, but here they can obstruct the driver's view in a dangerous manner and hinder access to the rear seats.

On shorter journeys, a jacket is also often hung up on a coat peg, customary in vehicles, which is likewise arranged over the door and is often combined with the grab handle, and this can likewise lead to impairment of the drivers view and hinder entry and exit.

In order to be able to secure even relatively large loads and in order not to put passengers at risk, the device has to be very stable and as compact as possible, and also has to be able to be mounted and removed quickly.

SUMMARY OF THE INVENTION

It is a first object of the present invention to provide a fastening unit which can be inserted between the headrest rods or can be removed therefrom without the headrest having to be raised beyond the height of the fastening unit.

It is a second object of the present invention to provide a fastening unit which can be inserted between the headrest rods or can be removed therefrom using one hand and without aids.

It is a third object of the present invention to provide a fastening unit in which the production costs can be reduced by a reduction in the components.

It is a fourth object of the present invention to provide a fastening unit which, while having a minimum overall height, ensures a stable connection to the headrest rods without having an adverse effect in the process on the height adjustability of the headrest.

It is a fifth object of the present invention to provide a fastening unit which can be attached to headrest rods having different diameters and spacings from each other.

It is a sixth object of the present invention to provide a fastening unit which can be mounted on and can be removed from the headrest rods simply and quickly without tools or expert knowledge.

It is a seventh object of the present invention to provide a fastening unit which, when mounted on the headrest rods, cannot pose a risk of injury to the passengers.

It is an eighth object of the present invention to provide a device for suspending objects, which device can be attached to and can be removed from vehicle seats rapidly and in an uncomplicated manner and is as robust as possible such that even relatively heavy objects can be suspended. Furthermore, the intention is for the device to be designed in such a manner that it takes up as little space as possible when not in use and does not represent a risk of injury to the occupants of the vehicle.

These objects are achieved according to the invention by a fastening unit for connecting a device to two spaced-apart headrest rods of a vehicle seat and by a device.

The fastening unit according to a first realization according to the invention comprises a first coupling element for receiving a second coupling element arranged on the device, and with a first fastening element arranged on the first coupling element and a second fastening element connected movably to the first fastening element, with which fastening elements the first coupling element can be fastened to the headrest rods, wherein the first fastening element and the second fastening element are supported on the headrest rods and are movable relative to each other parallel to a connecting line running approximately horizontally between the centers of the headrest rods.

According to a preferred embodiment of the invention, the first coupling element is arranged centrally between the two headrest rods and is designed as a receiving bushing into which the second coupling element, which is designed as a plug element, can be plugged. Such an assignment of the receiving bushing and plug element has the advantage that, even if a device is not connected to the fastening unit, no parts of the first coupling element could protrude and lead to a risk of injury to the passengers. In principle, however, a reverse assignment of the receiving bushing and plug element to the first and second coupling elements would also be possible.

It is advantageous if the plug-in direction of the plug element into the receiving bushing takes place perpendicularly to a connecting line of the headrest rods and approximately horizontally. This results in a high degree of stability, with a minimum height of the fastening unit, and convenient handling for the users. In principle, however, an approximately vertical or oblique plug-in direction would also be possible.

The plug element is locked in the receiving bushing preferably via a manually releasable locking device arranged on the plug element. The locking mechanism preferably comprises latching hooks which are arranged on both side surfaces of the plug element and which can be released by pressing together actuating members likewise arranged on both side surfaces of the plug element.

In a preferred embodiment, the receiving bushing and the fastening elements are arranged laterally next to one another and are approximately identical in height, which results in a particularly compact and flat construction of the fastening unit. By means of this arrangement, the available overall height of the fastening unit can be fully used both for the receiving bushing and for the fastening elements, which substantially improves the stability.

In a development, the first fastening element and the first coupling element together form an elongate housing approximately in the form of a parallelepiped, in which the receiving bushing is accommodated and which is connected to the second fastening element via a telescopic extender. In this case, the first and the second fastening element move relative to each other parallel to a connecting line running approximately horizontally between the centers of the headrest rods.

In this case, the second fastening element can be guided in the first fastening element, or the first fastening element can be guided in the second fastening element. The outsides of the two fastening elements are preferably approximately aligned, and therefore the fastening unit has as compact and homogeneous a shape as possible.

In a preferred embodiment, the second fastening element engages around the first fastening element, wherein, in the region of the receiving bushing opening which is arranged on the first fastening element, a recess is to be provided on the corresponding side wall of the second fastening element. The opening in the receiving bushing is preferably aligned with the side wall of the first fastening element.

The first and the second fastening element are pressed apart from each other preferably by means of a pressure spring clamped there between, wherein stops which restrict the movement travel are to be provided. Said movement travel is determined by the minimum and the maximum spacing of the headrest rods, on which the fastening unit is intended to be able to be mounted, wherein the adaptations to the different spacings of the headrest rods take place automatically.

Forked recesses are provided at the free ends of the two fastening elements, the limbs of which recesses diverge in a V-shaped manner such that the recesses can be supported against headrest rods of different diameter.

In order to attach the fastening unit to the headrest rods, the recess of one of the fastening elements is brought into contact with one of the headrest rods which serves, as it were, as a "rotary bearing", and the other fastening element is drawn back until the fastening unit can pivot past the free headrest rod and the second recess can be fitted against the free headrest rod.

For removal, one of the fastening elements is drawn back, and the fastening unit is pivoted out of the headrest rods.

This is also possible whenever a blocking device is provided between the first and second fastening element, which blocking device has to be released via an actuating element for the two fastening elements to be pressed together. The actuating element is advantageously arranged on one of the fastening elements in such a manner that it can be operated, for example, with the thumb, as the fastening element is being drawn back. The fastening unit can thus be mounted and removed one-handed.

In a preferred embodiment, a latching device can be provided, with which the relative movements of the two fastening elements in one or both directions of movement can be blocked. This has the advantage that the stability of the fastening unit on the headrest rods is not dependent on the strength of the spring force, with which the fastening elements are pressed against the headrest rods, or on the angle of the V-shaped limbs which are supported against the headrest rods.

In a particularly advantageous manner, the fastening elements are blocked with a latching mechanism which permits an unhindered movement of the fastening elements apart from each other, in the direction of the headrest rods, but blocks a movement of the fastening elements toward each other, away from the headrest rods.

For this purpose, a rack segment with a serration can be arranged on one of the fastening elements parallel to the direction of movement, and a spring-loaded pawl, which is arranged on the other fastening element, engages in said serration, wherein an actuating element which is preferably arranged on a side wall of said fastening element is to be provided, with which the pawl can be manually released such that the fastening elements can be moved freely toward each other in order to mount the fastening unit on, or to remove the latter from, the headrest rods.

According to a further embodiment, the two fastening elements can be moved toward each other or apart from each other with a threaded spindle, wherein the threaded spindle is arranged on the one fastening element and the spindle nut is arranged on the other fastening element, and the threaded spindle or the spindle nut can be rotated with an adjusting wheel which is accessible from the outside. The threaded spindle can be provided instead of or in addition to a spring in order to move the fastening elements. For example, the threaded spindle could be provided for the rough setting and the spring could be provided for compensating for tolerances in the rod spacings. When a threaded spindle is used, a latching device could be omitted, since a relative movement of the two fastening elements is blocked.

According to a further embodiment, the fastening elements can be supported on the headrest rods from the outside instead of from the inside, wherein then, instead of forked recesses, U-shaped hooks having conical limbs are preferably arranged at those ends of the fastening elements which are directed toward the headrest rods. Instead of a pressure spring which presses the fastening elements apart from each other, a draw spring which draws the fastening elements together would then be provided.

The receiving bushing, plug element and locking device are preferably designed and coordinated with one another such that, with the plug-in direction being maintained, the plug element can be plugged into the receiving bushing in two positions different by 180° and can be locked.

The receiving bushing and plug element could also be plugged together vertically or obliquely instead of horizontally. Similarly, the receiving bushing and plug element may also be designed in any other form instead of box-shaped, even with a plurality of pins and/or webs and corresponding receiving openings. Instead of a closed receiving bushing, other forms of connection, for example tongue and groove guides, dovetail guides or T guides could also be used.

Connections according to the principle of a bayonet fastener are also conceivable, in which a coupling element is introduced laterally into another coupling element and is then rotated or displaced. Also, a reversal of the assignment of male and female coupling elements to the fastening unit and to the device to be fastened to the fastening unit is possible.

In order to compensate for a generally rearwardly directed oblique position of the backrests and/or of the headrest rods of vehicle seats, the receiving bushing is preferably connected to the headrest rods at a corresponding angle such that said receiving bushing extends in a predominantly horizontal plane. The angle is preferably compensated for by a corresponding oblique position of the fastening element or of the clamping elements in relation to the receiving bushing, or by a corresponding oblique position of the forks in relation to the clamping elements.

The plug element can be connected fixedly or movably to the device, for example with an extendible linear guide or via a joint, preferably substantially parallel to a connecting line running horizontally between the centers of the headrest rods.

The fastening unit according to a second realization according to the invention comprises a first coupling element for receiving a second coupling element arranged on the device, and with fastening elements which are arranged on the first coupling element and with which the first coupling element can be fastened to the headrest rods, wherein the fastening elements comprise clamping elements which are moveable in opposite directions parallel to a connecting line of the headrest rods and are supported on the headrest rods.

According to a preferred embodiment of the invention, the first coupling element is arranged centrally between the two headrest rods and is designed as a receiving bushing into which the second coupling element, which is designed as a plug element, can be plugged. Such an assignment of the receiving bushing and plug element has the advantage that even if no device is connected to the fastening unit, no parts of the first coupling element could protrude and pose a risk of injury to the passengers. In principle, however, a reverse assignment of the receiving bushing and plug element to the first and second coupling element would also be possible.

It is advantageous if the plug-in direction of the plug element into the receiving bushing takes place perpendicularly to a connecting line of the headrest rods and approximately horizontally. This results in a high degree of stability, with a minimum height of the fastening unit and convenient handling for the users. In principle, however, an approximately vertical or oblique plug-in direction would also be possible.

According to a preferred embodiment, the receiving bushing and the fastening elements are arranged laterally next to one another and are approximately identical in height, which permits a particularly compact and flat construction of the fastening unit. By means of this arrangement, the available overall height of the fastening unit can be fully used both for the receiving bushing and for the fastening elements and the clamping elements arranged on the fastening elements, which substantially improves the stability.

In an advantageous manner, the receiving bushing and the fastening elements are arranged in a plate-like housing, the lower and upper broad sides of which run approximately horizontally. The housing is preferably formed from two horizontally separated housing shells into which the functional parts can be inserted before mounting. It would also be possible to design the receiving bushing and the fastening elements as a single-part component which advantageously has openings on the lower side for the insertion of the functional parts.

The plug-in openings of the receiving bushing are preferably aligned with the side walls of the housing, which side walls run transversely with respect to the plug-in direction of the plug element. Said side walls are preferably curved convexly, with a maximum spacing from one another in the center of the receiving bushing and a minimum spacing from one another in the region of the headrest rods. This ellipsoidal configuration gives rise to an optimum housing contour with regard to safety, stability and esthetics.

Since, however, the headrest rods are generally not arranged centrally with respect to the thickness of the backrests and headrests, and the excess length of the backrests and headrests beyond the headrest rods is generally smaller to the front than to the rear, the excess length of the housing beyond the headrest rods is preferably also smaller to the front than to the rear, thus ensuring that the housing cannot protrude over the front contours of the backrests and headrests and have an adverse effect on the seat comfort or the safety of passengers.

Rod openings for receiving the headrest rods are preferably arranged on the narrow sides of the housing, which sides are directed toward the headrest rods, and therefore the housing at least partially surrounds the headrest rods, and the clamping elements are also supported in the housing in the region of the headrest rods.

The headrest rods are generally guided in guide sleeves which are arranged in the backrests. From the upper side of the backrests, said guide sleeves are generally closed by rosettes which protrude beyond the upper side of the backrests. Since the housing in the region of the headrest rods can be lowered only as far as the upper side of the rosettes, an intermediate space is formed between the two rosettes and between the lower side of the housing and the upper side of the backrest, said intermediate space providing space for a protrusion which is arranged on the lower side of the housing and permits a partial enlargement of the height of the housing in the region of the receiving bushing without thereby restricting the available path for the lowering of the headrest.

Said additional height can be used for enlarging the height of the receiving bushing and of the plug element and/or of the top wall and the bottom wall of the receiving bushing.

In a preferred embodiment, guides in which the clamping elements are guided movably parallel to a connecting line of the headrest rods are arranged on the fastening elements. The guides are preferably designed as guide channels which extend from the side walls of the plug-in bushing as far as the side wall of the housing in the region of the rod openings. The cross-shaped arrangement of the guide channels and receiving bushing in the housing form an optimum transmission of force between the clamping elements and receiving bushing.

U-shaped forks are preferably arranged at those ends of the clamping elements which are directed toward the headrest rods, the limbs of which forks preferably diverge conically, and therefore the forks can be supported on headrest rods of differing diameter.

In order to achieve a support which is as stable as possible, the height of the forks preferably corresponds to the outer height of the housing. Corresponding recesses are to be provided on the upper and lower broad side of the housing so that the forks can move freely between the inner and outer end positions thereof.

The clamping elements are preferably pressed against the headrest rods by pressure springs, wherein stops which limit the maximum extension distance of the clamping elements are to be provided. The extension distance of the clamping elements is determined by the minimum and the maximum spacing of the headrest rods, on which the fastening unit is intended to be mounted, wherein the adaptations to the different spacings of the headrest rods take place automatically.

The spring force with which the clamping elements are pressed against the headrest rods has to be coordinated in such a manner that, on the one hand, the axial movement of the headrest rods is not obstructed and, on the other hand, the fastening unit is clamped in a stable manner between the headrest rods.

The guides of the clamping elements are preferably arranged on the side walls and extend as far as the outer ends of the forks. Two struts are preferably arranged behind the forks, the outer sides of which struts form part of the guides, and a clearance for receiving the pressure spring is provided between said struts.

The fastening unit is mounted on the headrest rods in a simple manner by the headrest being moved out of the backrest to an extent such that the forks of the two clamping elements can be inserted into the two headrest rods in a corresponding oblique position of the housing. The fastening unit is subsequently pushed against the upper side of the backrest until the housing rests horizontally on the rosettes of the guides of the headrest rods. The headrest can then be brought into the desired position.

The movements of the two clamping elements could be synchronized mechanically. This could take place, for example, with racks which are arranged on the clamping elements and mesh on opposite sides with a common pinion.

In a preferred embodiment, latching devices can be provided, by means of which the clamping elements can be blocked in one direction of movement or in both directions of movement. This has the advantage that the stability of the fastening unit on the headrest rods is not dependent on the strength of the spring force, with which the clamping elements are pressed against the headrest rods, or on the angle of the limbs of the forks.

In a particularly advantageous manner, the clamping elements are blocked by means of latching mechanisms which permit an unobstructed movement of the clamping elements in the direction of the headrest rods but block a movement in the direction of the receiving bushing. For this purpose, correspondingly designed rack segments could be arranged on the clamping elements parallel to the direction of movement, and spring-loaded pawls which are arranged on the housing engage in said rack segments, wherein actuating elements are to be provided, by means of which the pawls can be manually released such that the clamping elements can move freely for the mounting or removal of the fastening unit. The actuating elements are preferably designed as push or sliding switches and are arranged on the upper side or on the side wall of the housing.

According to a further embodiment, the clamping elements could be prestressed against the headrest rods from the outside instead of from the inside, wherein, then, instead of forks, U-shaped hooks having conical limbs are preferably arranged at those ends of the clamping elements which are directed toward the headrest rods.

According to a further embodiment, a movable clamping element could be provided only on one side of the fastening unit while, on the other side, a fixed fork is arranged on the housing. However, this results in the fastened devices not being fastened to the vehicle seat centrally between the headrest rods. This may be compensated for by a plurality of receiving bushings or first coupling elements which are arranged next to one another or are laterally displaceable being provided in the fastening unit.

In order to lock the plug element in the receiving bushing, a manually releasable locking device is preferably provided, with one or more recesses and a spring-loaded latch which engages in the recesses and is movable approximately transversely with respect to the plug-in direction of the plug element.

The recesses are preferably arranged on the plug element and the latch is arranged on the receiving bushing. By means of the arrangement of a plurality of recesses one behind another, the plug element can be locked in different plug-in depths in the receiving bushing.

An actuating member is provided to release the locking mechanism, said actuating member being arranged on the side wall of the housing preferably to the side of the plug-in opening in the receiving bushing and with which the latch can be moved into a release position. The actuating member may be designed as a sliding switch which can be moved transversely with respect to the push-in direction of the plug element. In this case, the latch and actuating member may form a common component which is moved into the locking position by means of a latch spring. As an alternative, the actuating member could be designed as a separate pushbutton which is operatively connected to the latch via an oblique surface.

The receiving bushing, plug element and locking device are preferably designed and coordinated with one another in such a manner that the plug element, with the plug-in direction being maintained, can be plugged into the receiving bushing in two positions different by 180° and can be locked.

This permits the fastening of devices in two orientations different by 180°, for example on the drivers' and passengers' seats.

In a further embodiment, the receiving bushing has two mutually opposite plug-in openings such that the plug element can be plugged into the receiving bushing from the front side or the rear side of the vehicle seat. This makes it possible to attach devices on the front side or the rear side of the vehicle seat without altering the fastening unit.

It is advantageous to design the locking device in such a manner that the plug element can be locked in opposite plug-in directions, for example by means of a correspondingly offset arrangement of the recesses on both side walls of the plug element.

When receiving bushings having two opposite plug-in openings are used, stops which limit the plug-in depth of the plug element are preferably arranged on the plug element.

The receiving bushing and the plug element are preferably of plate-like design. The internal guides of the receiving bushing and the external guides of the plug element preferably run parallel, and therefore a form-fitting reception of the plug element in the receiving bushing is ensured irrespective of the plug-in direction or plug-in depth.

Instead of being box-shaped or plate-like, the receiving bushing and plug element could also be configured in any other shape, even with a plurality of pins and/or webs and corresponding receiving openings. Instead of a closed receiving bushing, other forms of connection, for example tongue and groove guides, dovetail guides or T guides could also be used. Connections according to the principle of a bayonet fastener are also conceivable, in which a coupling element is introduced laterally into another coupling element and is then rotated or displaced. Also, a reversal of the assignment of male and female coupling elements to the fastening unit and to the device to be fastened to the fastening unit is possible.

In order to compensate for a generally rearwardly directed oblique position of the backrests and/or of the headrest rods of vehicle seats, the receiving bushing is preferably connected to the headrest rods at a corresponding angle such that said receiving bushing extends in a predominantly horizontal plane. The angle is preferably compensated for by a corresponding oblique position of the fastening element or of the clamping elements in relation to the receiving bushing, or by a corresponding oblique position of the forks in relation to the clamping elements.

The plug element can be connected to the device fixedly or via a joint. The joint axis here runs preferably parallel to a connecting plane of the two headrest rods.

The device according to a third realization according to the invention comprises a fastening member for connecting the device to the vehicle seat part, with a receiving bushing and a plug element, which fastening member can be coupled to the receiving bushing, and a locking mechanism for locking the plug element in the receiving bushing, and a support arm for suspending the objects, wherein the locking mechanism and the support arm for suspending the objects are arranged on the plug element, and wherein the support arm can be moved between a non-use position, in which the support arm bears substantially against the plug element or is entirely or partially accommodated therein, and a use position, in which said support arm is accessible for suspending the objects.

The plug element preferably comprises a substantially rectangular housing, with a guide element which is somewhat set back and is received by the receiving bushing, which is preferably likewise rectangular. The step thus formed between the guide element and the outer walls of the housing is supported here on the edge of the receiving bushing and forms a stable stop for the plug-in depth of the plug element.

In a preferred embodiment, the locking mechanism is accommodated in the housing and comprises two spring arms which are connected at the rear end to the housing in an articulated manner and, at the front ends, have outwardly directed latching hooks which are pressed outward by a latching spring and latch into corresponding recesses on the inside of the receiving bushing.

Outwardly directed actuating members are preferably arranged on the spring arms, with which actuating members the spring arms can be pressed toward each other in order to release the latching hooks.

According to a preferred embodiment, the support arm comprises a bottom wall, and an end wall which is arranged at the front end of the bottom wall, runs approximately vertically and at the upper end of which a holding-down device, which runs approximately parallel to the bottom wall and is directed toward the fastening member, is arranged.

Preferably, the support arm is guided by a linear guide below or above the locking mechanism in the housing and is provided with a spring device which draws the support arm into the housing when not in use.

The housing is preferably divided by an intermediate floor, which runs parallel to the broad sides thereof, into two receiving spaces which are located one above the other and extend substantially over the entire length of the plug element, wherein the extendible support arm is preferably accommodated in the lower receiving space and the locking mechanism of the plug element is preferably accommodated in the upper receiving space.

In a particularly advantageous manner, the receiving space for the support arm extends as far as the end of the guide element, and therefore as large as possible a guide length is available for the support arm, which has a positive effect on the extension travel and/or the stability of the support arm.

It is furthermore advantageous if a trough-shaped depression, in which the end wall and/or the holding-down device of the support arm are accommodated in the non-use position, is formed on the outside of the front wall and/or top wall of the housing. In this case, the trough for receiving the holding-down device is preferably extended beyond the holding-down device to an extent such that the edge of the holding-down device can be detected for drawing the support arm out of the housing.

An additional clothes peg, which can be used both in the use position and in the non-use position of the support arm, is formed in the end wall and in the holding-down device of the support arm.

According to a further preferred embodiment, the support arm can be connected to the housing via a joint with an axis of rotation running substantially parallel to the broad side of the backrest and/or headrest and horizontally. In this case, the joint is preferably arranged at the rear end of the bottom wall of the support arm, and therefore, in the non-use position, the support arm together with the holding-down device directed toward the broad side of the housing bears against the top wall of the housing substantially congruently thereto. The support arm is preferably prestressed into the non-use position with a leg spring.

A particularly advantageous configuration of the device is distinguished in that a locking mechanism and the support arm for suspending the objects are arranged on the plug element. The support arm here can be moved between a non-use position, in which it bears substantially against the plug element or is entirely or partially accommodated therein, and a use position, in which the support arm is accessible for suspending the objects. The plug element here has means for actuating the locking mechanism, and therefore, when the means are actuated, the plug element can be unlocked one-handed and drawn out of a receiving bushing.

It goes without saying that in particular a combination of the fastening unit with the suspension device forms a particularly preferred advantageous refinement of the invention.

It goes without saying that the features mentioned above and those which have yet to be explained below can be used not only in the respectively stated combination but also in different combinations or on their own without departing from the scope of the present invention.

BRIEF DESCRIPTION OF THE DRAWING

The invention is explained in more detail below in exemplary embodiments with reference to the associated drawings.

FIG. 1 shows a longitudinal section from the side of a first alternative of the fastening unit according to the invention, mounted on two headrest rods.

FIG. 2 shows a longitudinal section of the fastening unit according to FIG. 1 from above.

FIG. 3 shows the plug element for the fastening unit according to FIGS. 1 and 2 in a longitudinal section from above.

FIG. 4 shows a perspective view of the fastening unit according to FIGS. 1 and 2 with the plug element according to FIG. 3 in a non-mounted state.

FIG. 7 shows a perspective view from the rear of a third alternative of the fastening unit according to the invention upon insertion between the headrest rods.

FIG. 8 shows a perspective view of the fastening unit according to FIG. 7 from the front.

FIG. 9 shows a view of the fastening unit according to FIGS. 7 and 8 from above.

FIG. 10 shows a longitudinal section from above of the fastening unit according to FIGS. 7 to 9 with the plug element in a non-mounted state.

FIG. 38 shows a perspective view of yet another alternative of the plug element with an integrated support arm in the non-use position.

FIG. 39 shows a perspective view of the plug element according to FIG. 38 with the support arm in the use position.

FIG. 40 shows a longitudinal section through the plug element according to FIG. 38 with the fastening unit, mounted on a vehicle seat.

FIG. 41 shows a longitudinal section through the plug element according to FIG. 39 with the fastening unit, mounted on a vehicle seat.

FIG. 42 shows a perspective view of yet another alternative of the plug element with an integrated support arm in the use position.

FIG. 43 shows a side view of the plug element according to FIG. 42 with the support arm in the use position.

FIG. 44 shows a perspective view of the plug element according to FIGS. 42 and 43 with the support arm in the non-use position.

FIG. 45 shows a side view of the plug element according to FIG. 44 with the support arm in the non-use position.

FIG. 46 shows a longitudinal section of the plug element according to FIGS. 42 and 45 with the support arm in the use position.

FIG. 47 shows a longitudinal section of the plug element according to FIGS. 44 and 45 with the support arm in the non-use position.

FIG. 48 shows a perspective inside view of the plug element according to FIG. 47.

FIG. 49 shows an inside view from above of the plug element according to FIG. 47.

DESCRIPTION OF THE PREFERRED EMBODIMENT

Figure 5:
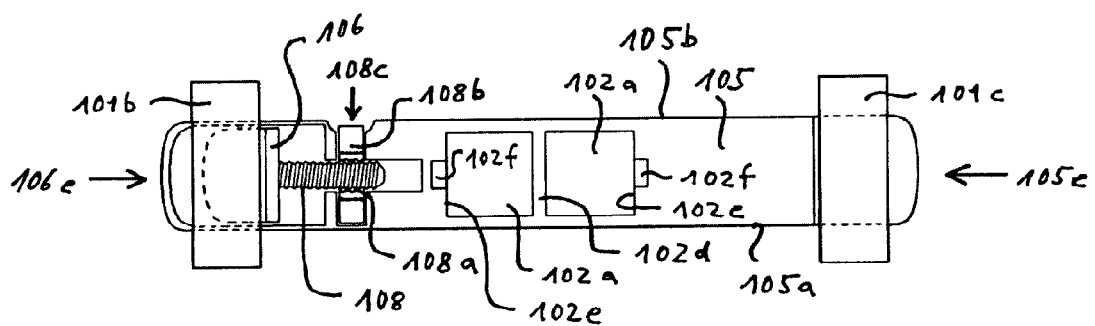
FIG. 5 shows a longitudinal section from the side of a second alternative of the fastening unit according to the invention, mounted on two headrest rods.

FIGS. 1 to 4 show a first alternative of a first fastening unit according to the invention. The A first fastening element 105 comprises an elongate housing in the form of a right-angled parallelepiped with a bottom wall 105a, a top wall 105b, a front side wall 105c and a rear side wall 105d.

A receiving bushing 102a is arranged approximately centrally in the housing of the first fastening element 105, said receiving bushing 102a having, on the front side wall 105c, an opening 102b, into which the a guide element 103f of a plug element 103a can be plugged. In order to stabilize the receiving bushing 102a, a guide web 102d is attached centrally to a rear wall 102c, and a recess 103f' provided on the plug element 103a engages in said guide web 102d when the plug element 103a is plugged into the receiving bushing 102a.

Spring arms 103g, which are mounted on joints 103g' on both sides of the guide element 103f and are prestressed toward each other by springs 103o, are attached to the plug element 103a and latching hooks 103h, which engage in corresponding recesses 102f on side walls 102e of the receiving bushing 102a and lock the plug element 103a in the receiving bushing 102a, are arranged at the front ends of said spring arms.

On the two spring arms 103g, outwardly directed actuating members 103i are arranged between the latching hooks 103h and the joints 103g, said actuating members protruding from the plug element 103a through pushbutton openings 103k in side walls 103d. In order to release the locking mechanism, the two actuating members 103i are pressed toward each other and the guide element 103f of the plug element 103a is drawn out of the receiving bushing 102a.

The second fastening element 106 is guided in the first fastening element 105 by linear guides 105h, 106h and can be moved relative to the first fastening element 105 parallel to a connecting line 100 running approximately horizontally between the centers of headrest rods 101b, 101c. The second fastening element 106 is pressed in the direction of the headrest rod 101b by a tension spring 107.

Forked recesses 105f, 106f, in which the headrest rods 101b, 101c are accommodated, are arranged at outer ends 105e, 106e of the first fastening element 105 and of the second fastening element 106. Limbs 105g, 106g of the forked recesses 105f, 106f open in a V-shaped manner in the direction of the headrest rods 101b, 101c, and therefore even headrest rods 101b, 101c of differing diameter bear approximately tangentially against the limbs 105g, 106g.

Figure 6:
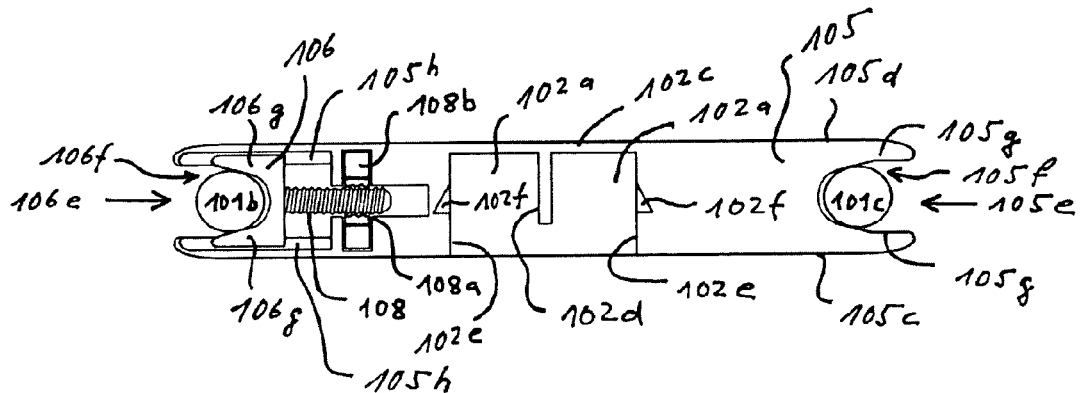
FIG. 6 shows a longitudinal section from above of the fastening unit according to FIG. 5.

FIGS. 5 and 6 show a second alternative of the a fastening unit according to the invention. Instead of a tension spring 107, a threaded spindle 108 is provided in this alternative, in order to move a second fastening element 106 relative to the first fastening element 105 and to press said second fastening element against the a headrest rod 101b.

The threaded spindle 108 is connected fixedly to the second fastening element 106. A spindle nut 108a is mounted rotatably in the first fastening element 105 and can be rotated by an adjusting wheel 108b, which protrudes through a housing opening 108c, as a result of which, depending in each case on the direction of rotation, the first and the second fastening elements 105, 106 are moved toward each other or apart from each other.

FIGS. 7 to 16 show a third alternative of a fastening unit according to the invention. In this alternative, the first fastening element 105 is guided in second fastening element 106. The second fastening element 106 engages around the first fastening element 105 on all four sides, wherein the outsides of walls 105a, 106a, 105b, 106b, 105c, 106c, 105d, 106d of the two fastening elements 105, 106 are approximately aligned. For this purpose, the walls 105a, 105b, 105c, 106d are correspondingly offset in guide region 105h. In the region of an opening 102b in receiving bushing 102a, a front side wall 106c of the second fastening element 106 has been removed to an extent such that the opening 102b remains free.

FIGS. 7 to 10 show the two fastening elements 105, 106 in the position in which they are pressed together to the maximum extent, with the a recess 105f in contact with headrest rod 101b. In this position, the fastening unit can be pivoted past free headrest rod 101c in an approximately horizontal position about the headrest rod 101b (which serves, as it were, as a "rotary bearing") and can thus be inserted between the two headrest rods 101b, 101c or removed therefrom.

FIG. 10 shows an alternative of a plug element 103a. Spring arms 103g, latching hooks 103h and actuating members 103i together form a component made of a flexible plastic, which is inserted into the housing, formed from bottom wall 103, top wall 103c, side walls 103d, front wall 103e and guide element 103f.

Figure 11:
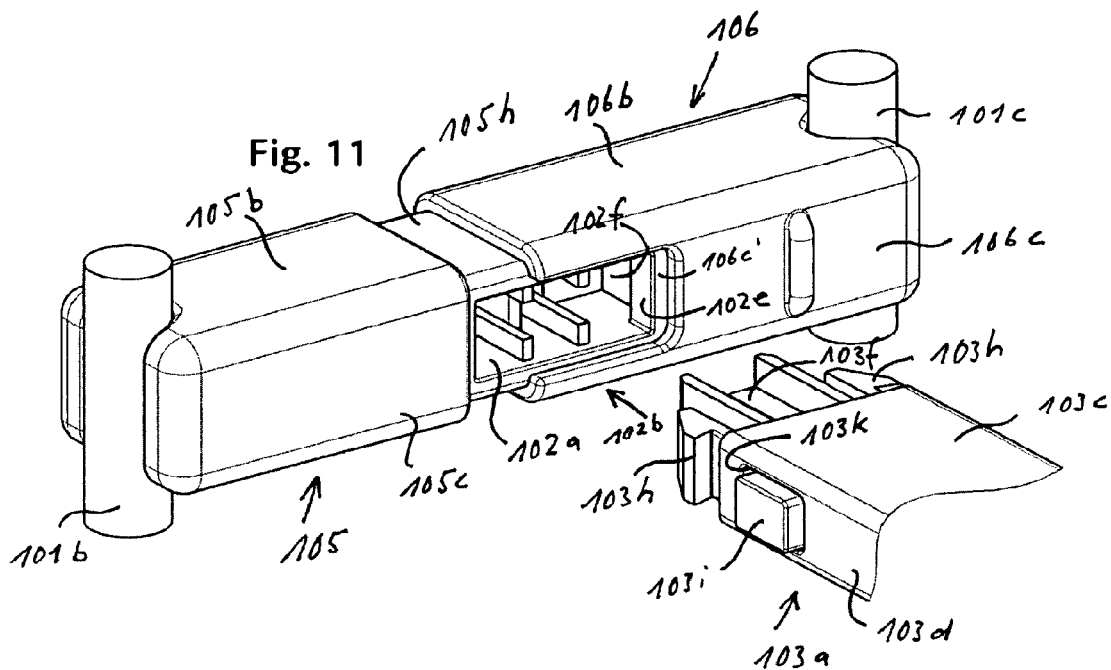
FIG. 11 shows a perspective view from the front of the fastening unit according to FIGS. 7 to 9 with the fastening elements in contact with headrest rods at a minimum spacing.
Figure 12:
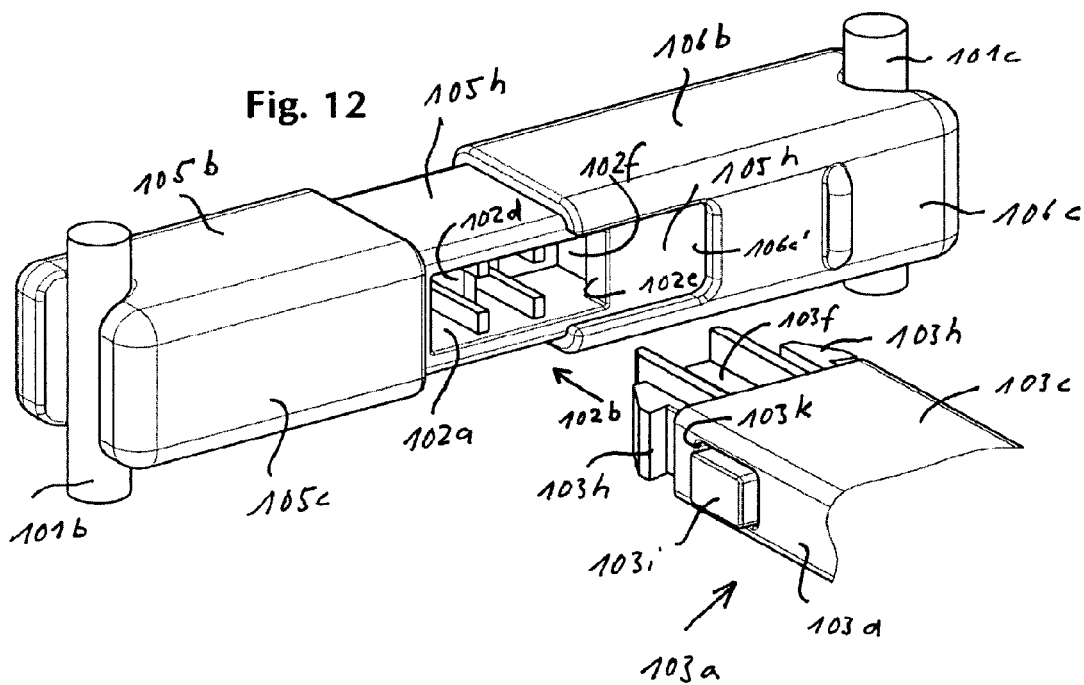
FIG. 12 shows a perspective view of the fastening unit according to FIG. 11 in contact with headrest rods at maximum spacing.

FIGS. 11 and 12 show the fastening unit clamped between the headrest rods 101b, 101c in two positions. FIG. 11 shows the fastening unit between headrest rods 101b, 101c having the largest diameter and smallest rod spacing, and FIG. 12 shows the fastening unit between headrest rods 101b, 101c having the smallest diameter and largest rod spacing. The front side wall 106c of the second fastening element 106 is provided with a cutout 106c' such that the opening 102b remains freely accessible for the insertion of the guide element 103f of the plug element 103a into the receiving bushing 102a.

Figure 13:
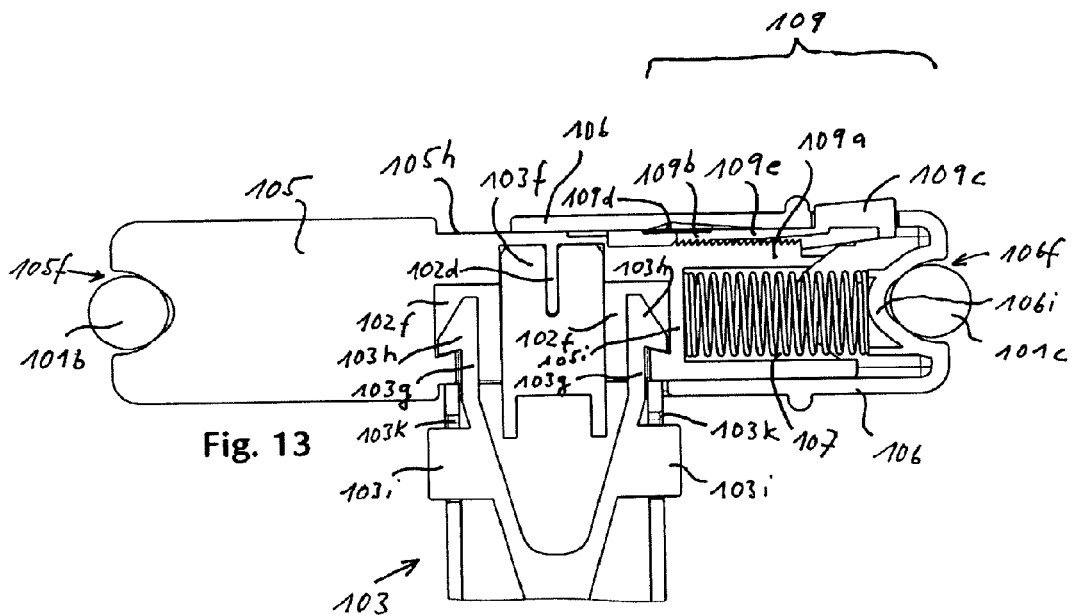
FIG. 13 shows a longitudinal section of the fastening unit according to FIG. 11 from above with the plug element plugged in, and with an active latching device.
Figure 14:
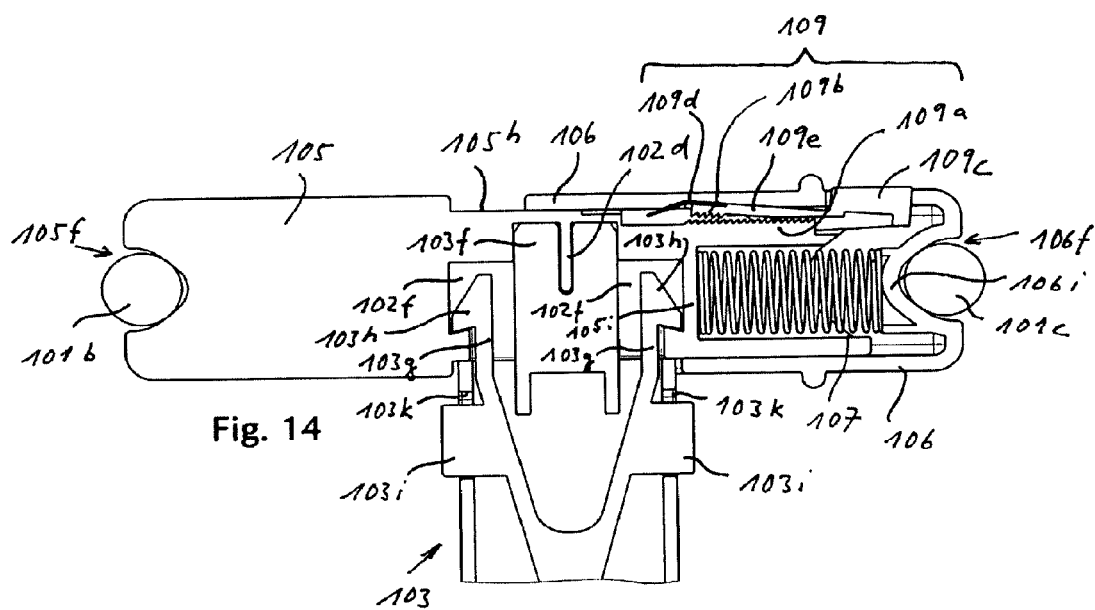
FIG. 14 shows a longitudinal section of the fastening unit according to FIG. 13 from above, with an inactivated latching device.
Figure 16:
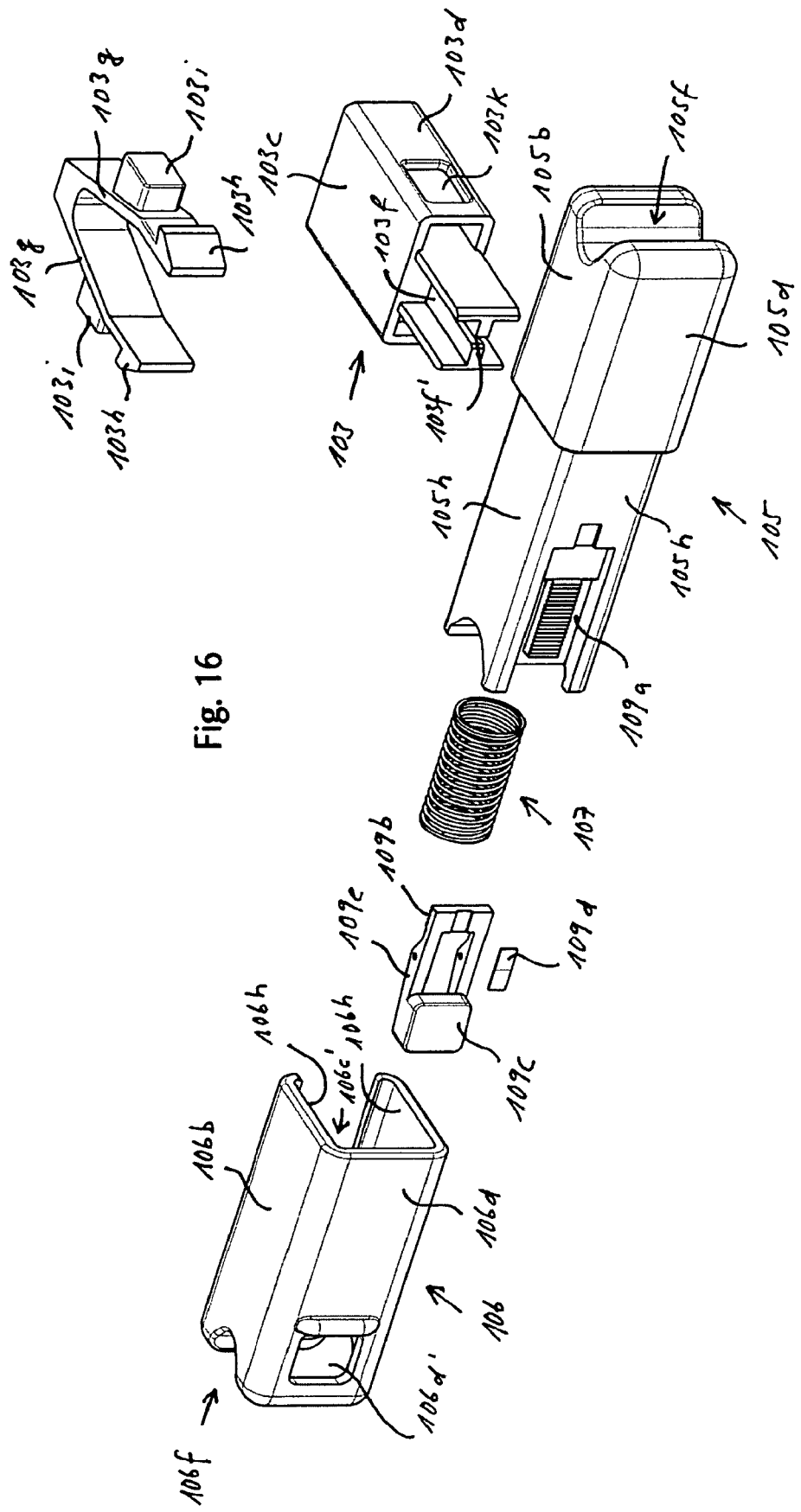
FIG. 16 shows an exploded illustration of the fastening unit according to FIGS. 7 to 15.
Figure 17:
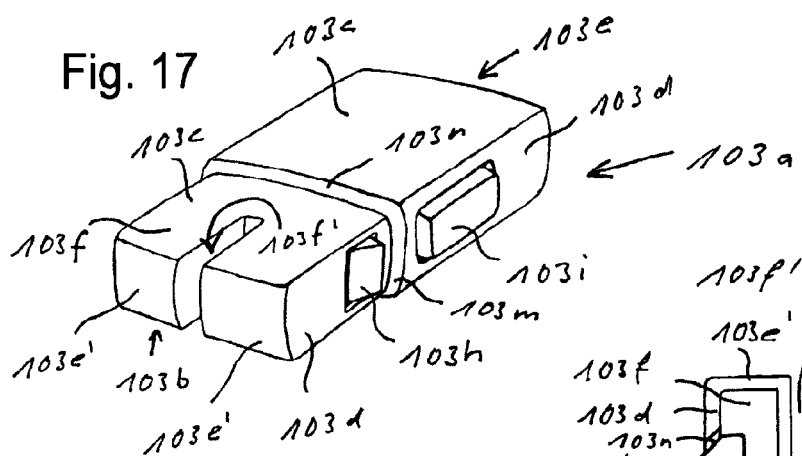
FIG. 17 shows a perspective view of a further alternative of the plug element.

FIGS. 13 and 14 show the function of latching device 109 in an activated position (FIG. 13) and inactivated position (FIG. 14). Details of the latching device are also shown in FIGS. 16 and 17. A rack 109a is arranged in the offset guide section 105h of the rear side wall 105d of the first fastening element 105. A rocker 109e is articulated on the rear side wall 106d of the second fastening element 106, and a pawl 109b is arranged on that side of the rocker 109e which is directed toward the first fastening element 105, and an actuating element 109c is arranged on that side of the rocker 109e which is directed toward recess 106f. An aperture 106d' for the actuating element 109c is provided in the rear side wall 106d. Latching spring 109d inclines the rocker 109e in such a manner that the pawl 109b is in spring-loaded engagement with the rack 109a. The rack 109a has a serration, and therefore the pawl 109b (as per the function of a latching mechanism) blocks a movement of the second fastening element 106 in the direction toward the first fastening element 105 and releases a movement of the second fastening element 106 in the direction away from the first fastening element 105. By pressure being applied to the actuating element 109*c*, the pawl 109*b* is disengaged from the rack 109*a* counter to the force of the latching spring 109*d* such that the two fastening elements 105, 106 can be moved toward each other.

Figure 15:
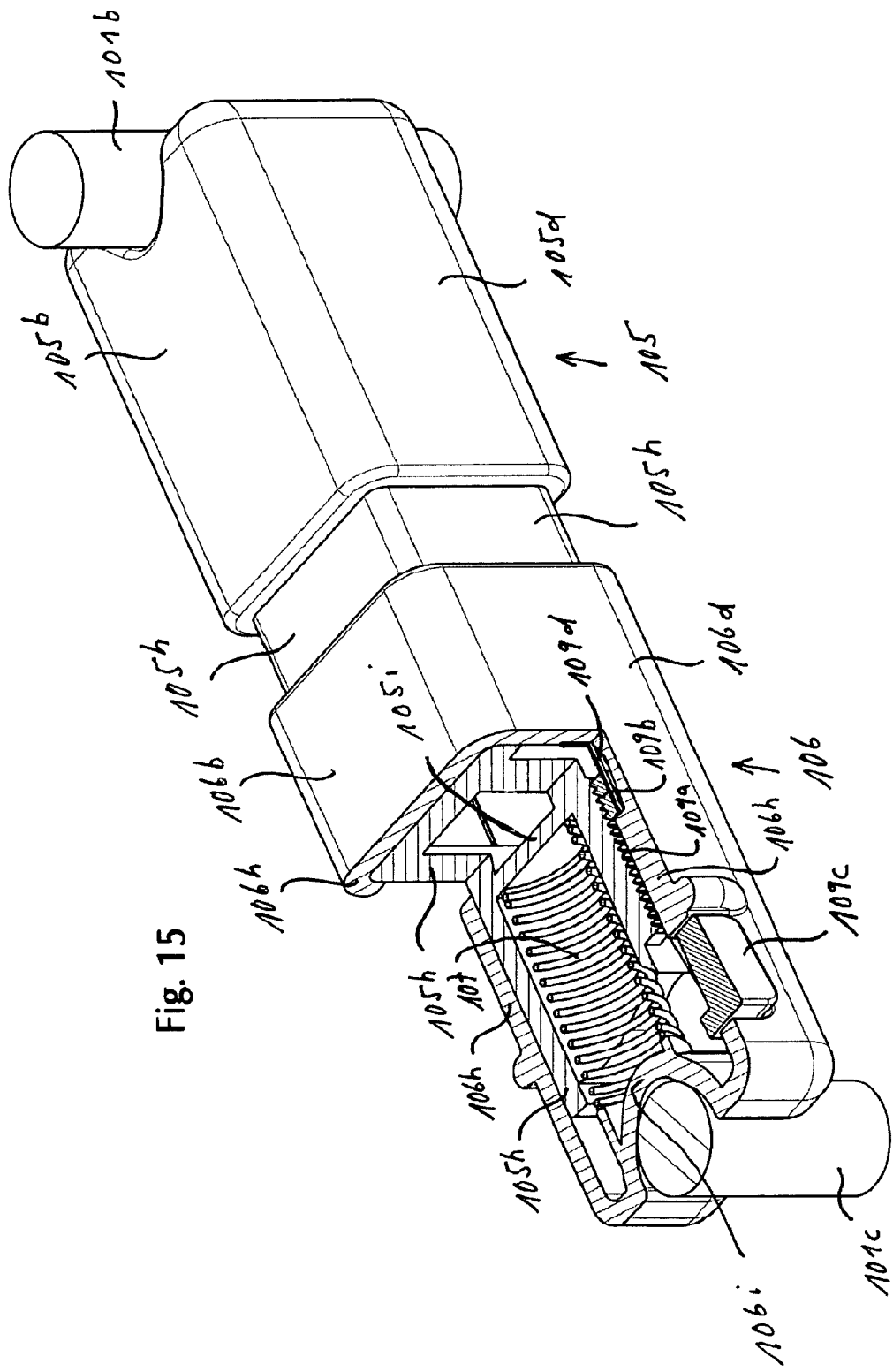
FIG. 15 shows a partially cut-away perspective view of the fastening unit with an active latching device.

FIG. 15 shows the construction of linear guides 105*h*, 106*h*, with which the two fastening elements are guided one inside the other, and a tension spring 107 which is supported on a support 105*i* of the first fastening element 105 and presses the second fastening element 106 on the a front wall 106*i* thereof in the direction toward the headrest rod 101*c*.

FIG. 16 shows, in an exploded illustration, the individual components of the fastening elements 105, 106 and the plug element 103*a*.

Figure 18:
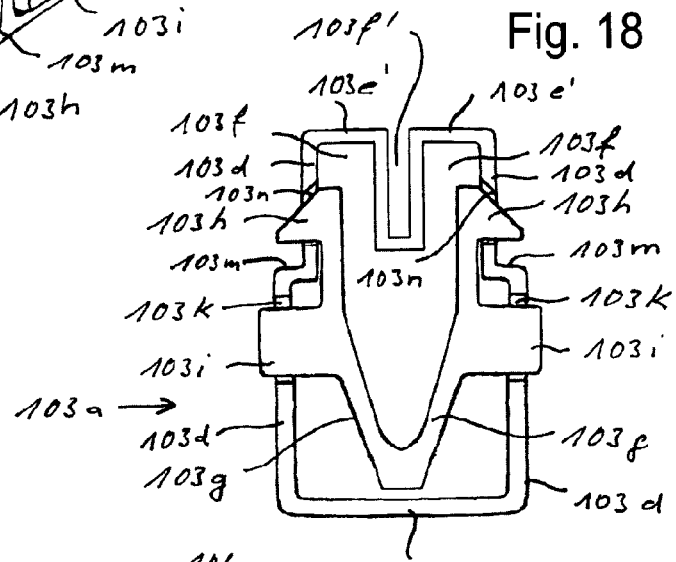
FIG. 18 shows a longitudinal section through the plug element according to FIG. 17 from above.
Figure 19:
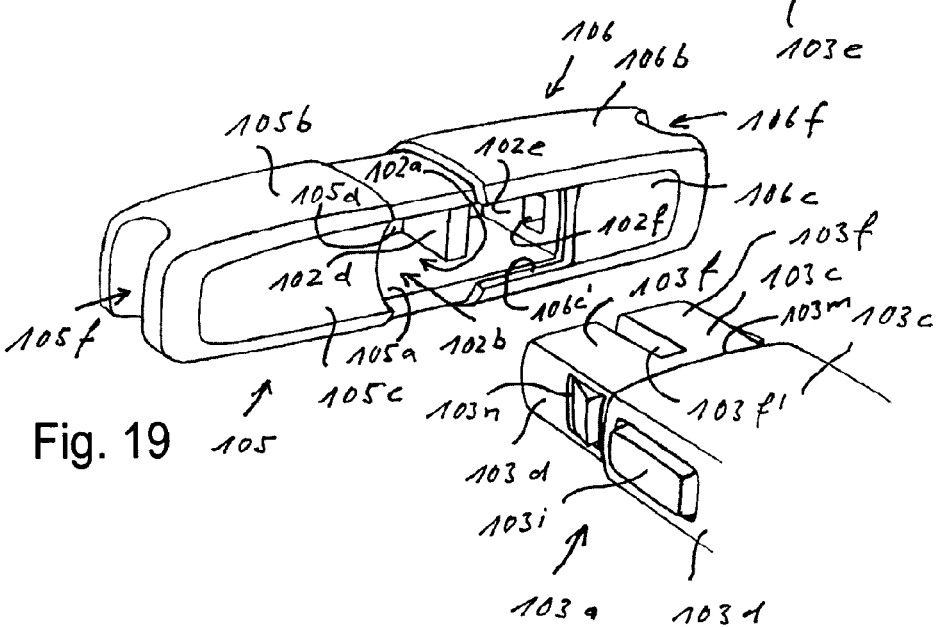
FIG. 19 shows a perspective view of a further alternative of the fastening unit with the plug element.

FIGS. 17 to 19 show a further alternative of the a fastening unit with a plug element 103*a*. A bottom wall 103*b*, a top wall 103*c*, and side walls 103*d*, which form the housing of the plug element 103*a*, are extended forward beyond two latching hooks 103*h* and are closed by front wall 103*e*' such that the plug element 103*a* forms a housing which is closed all the way around.

The bottom wall 103*b*, the side walls 103*d* and the top wall 103*c* are offset somewhat on guide element 103*f* of the plug element 103*a*, which guide element is received in a receiving bushing 102*a*, thus forming a step 103*m* all the way around, the step forming a stop for limiting the plug-in depth of the plug element 103*a* into the receiving bushing 102*a*, and forming a counter stop for the latching hooks 103*h*. Apertures 103*n*, through which the latching hooks 103*h* protrude out of the housing, and pushbutton openings 103*k* for actuating members 103*i* are provided on the side walls 103*d*.

A guide web 102*d* is mounted in the receiving bushing 102*a*, the guide web 102*d* connecting the a bottom wall 105*a*, rear side wall 105*d* and top wall 105*b* of the first fastening element 105 to one another and increasing the stability of the receiving bushing 102*a* and ensuring precise and play-free centering of the guide element 103*f*. A complementary recess 103*f*' for receiving the guide web 102*d* is provided in the guide element 103*f* of the plug element 103*a*.

Figure 20:
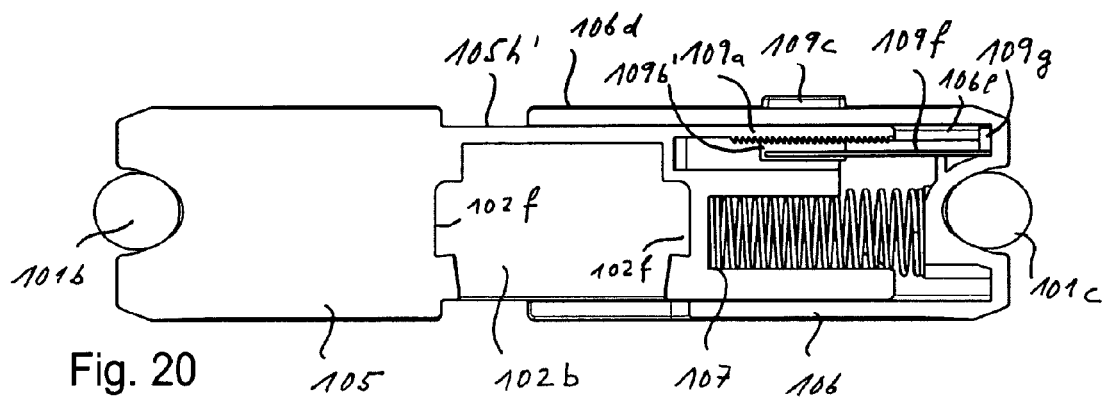
FIG. 20 shows a longitudinal section of the fastening unit from above, with an alternative of the latching device in the active position.
Figure 21:
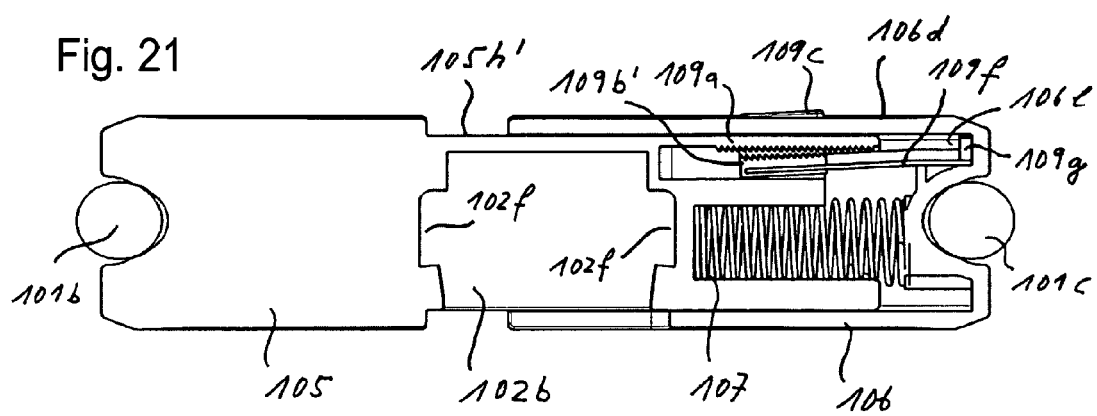
FIG. 21 shows a longitudinal section of the fastening unit according to FIG. 20 with the latching device in the inactive position.
Figure 22:
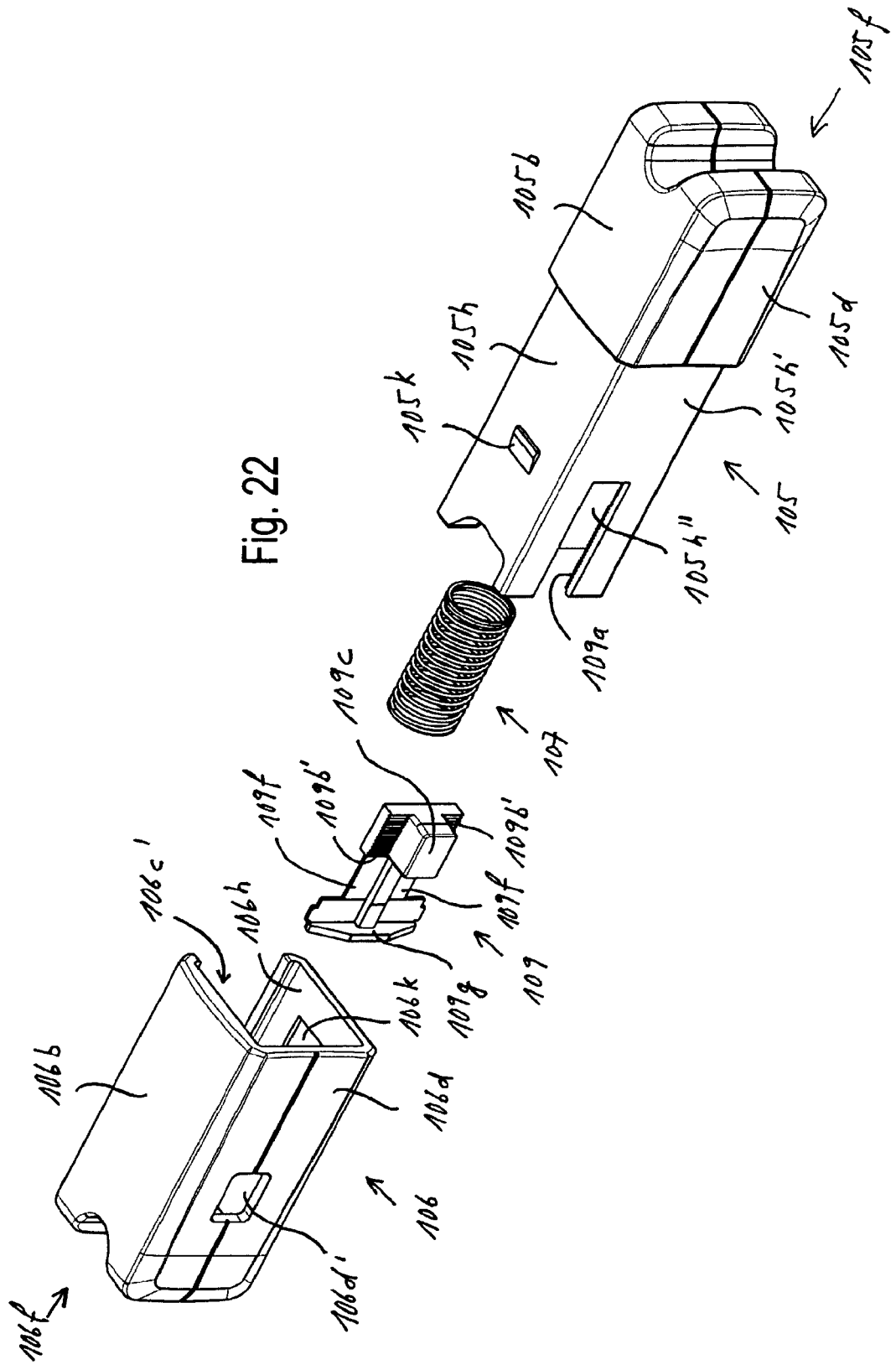
FIG. 22 shows an exploded illustration of the fastening unit according to FIGS. 20 and 21.

FIGS. 20 to 22 show a further alternative of latching device 109 for blocking the relative movement of the two fastening elements 105, 106 in an active position (FIG. 20) and inactivated position (FIG. 21).

The latching device 109 is arranged on the inside of the rear side wall 106*d* of the second fastening element 106, said latching device 109 comprising a leaf spring 109*f*, with an actuating member 109*c* having toothed segments 109*b*', which are arranged on both sides and are directed toward the inside of the rear side wall 106*d*, being arranged at that end of the leaf spring 109*f* which is directed toward the first fastening element 105, and with a spring mount 109*g*, with which the leaf spring 109*f* is fastened in a correspondingly designed receiving pocket 106*l* in the second fastening element 106, being arranged at that end of the leaf spring 109*f* which is directed toward recess 106*f*. A housing recess 106*d*', through which the actuating element 109*c* protrudes, is provided in the rear side wall 106*d*.

A pushbutton recess 105*h*", in which the actuating member 109*f* can move during a relative movement of the fastening elements 105, 106, is provided in an offset guide section 105*h*' of the a rear side wall 105*d* of the first fastening element 105. Racks 109*a*, which are directed inward on both sides of the longitudinal edges of the pushbutton recess 105*h*" and in which the two toothed segments 109*b*' on the actuating member 109*c* are kept in engagement by the pressure of the leaf spring 109*f*, are arranged on the inside of the guide section 105*h*'.

The teeth of the two racks 109*a* and toothed segments 109*b* are designed as serrations, and therefore they jointly form a latching mechanism which blocks a movement of the two fastening elements 105, 106 toward each other and releases a movement of the two fastening elements 105, 106 apart from each other. So that the two fastening elements 105, 106 can be pressed toward each other (for example for mounting or removing the fastening unit), the toothed segments 109*b* have to be brought out of engagement with the racks 109*a* by pressing of the actuating member 109*c*.

In order to limit the travel between the first and the second fastening element 105, 106, end stops 105*k* are provided on offset guide section 105*h* of the top wall 105*b* and of the bottom wall 105*a* of the first fastening element 105, and counter stops 106*k* are provided on the insides of top wall 106*b* and bottom wall 106*a* of the second fastening element 106.

Figure 23:
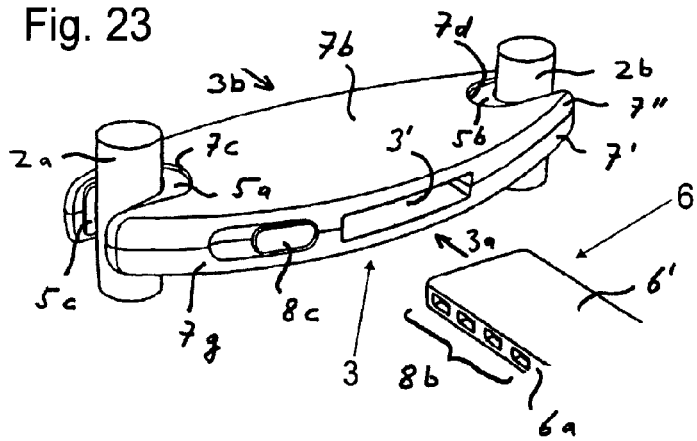
FIG. 23 shows a perspective view of a fourth alternative of the fastening unit according to the invention mounted on two headrest rods, and a cut-away plug element.
Figure 24:
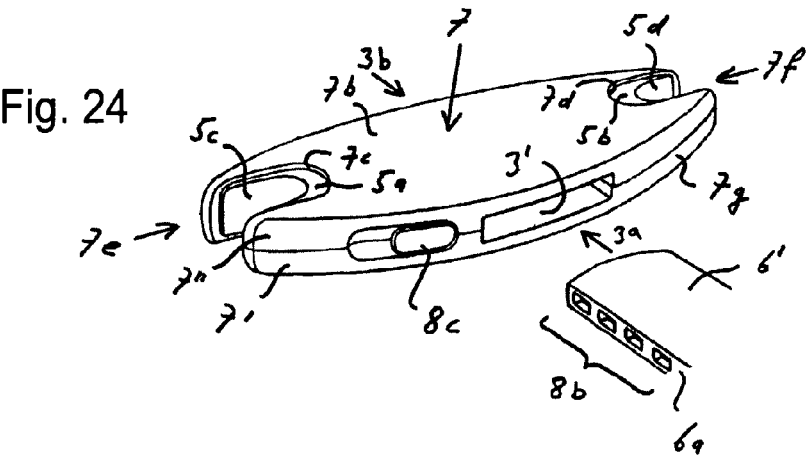
FIG. 24 shows a perspective view of the fastening unit according to FIG. 23 in a non-mounted state.

FIGS. 23 and 24 show a fourth alternative of fastening unit according to the invention. Plate-like housing 7 comprises a lower housing shell 7' and an upper housing shell 7", which have approximately the contour of an ellipse. Rod openings 7*e*, 7*f*, in which the headrest rods 2*a*, 2*b* are accommodated, are arranged on the narrow front sides of the two housing shells 7', 7". Corresponding recesses 7*c*, 7*d* for the headrest rods 2*a*, 2*b* are provided on the broad sides 7*a*, 7*b* of the housing shells 7', 7".

A receiving bushing 3' is accommodated in the housing 7 centrally between the headrest rods 2*a*, 2*b*, and the longitudinal axis of the receiving bushing runs perpendicularly to a connecting line of the headrest rods 2*a*, 2*b*. Plug-in openings 3*a*, 3*b* in the receiving bushing 3' for plug element 6' are aligned with convexly curved outer wall 7*g* of the housing 7. The lower and the upper broad sides 7*a*, 7*b* of the housing 7, and bottom wall 3*f* and top wall 3*e* run substantially horizontally and parallel to one another.

Figure 26:
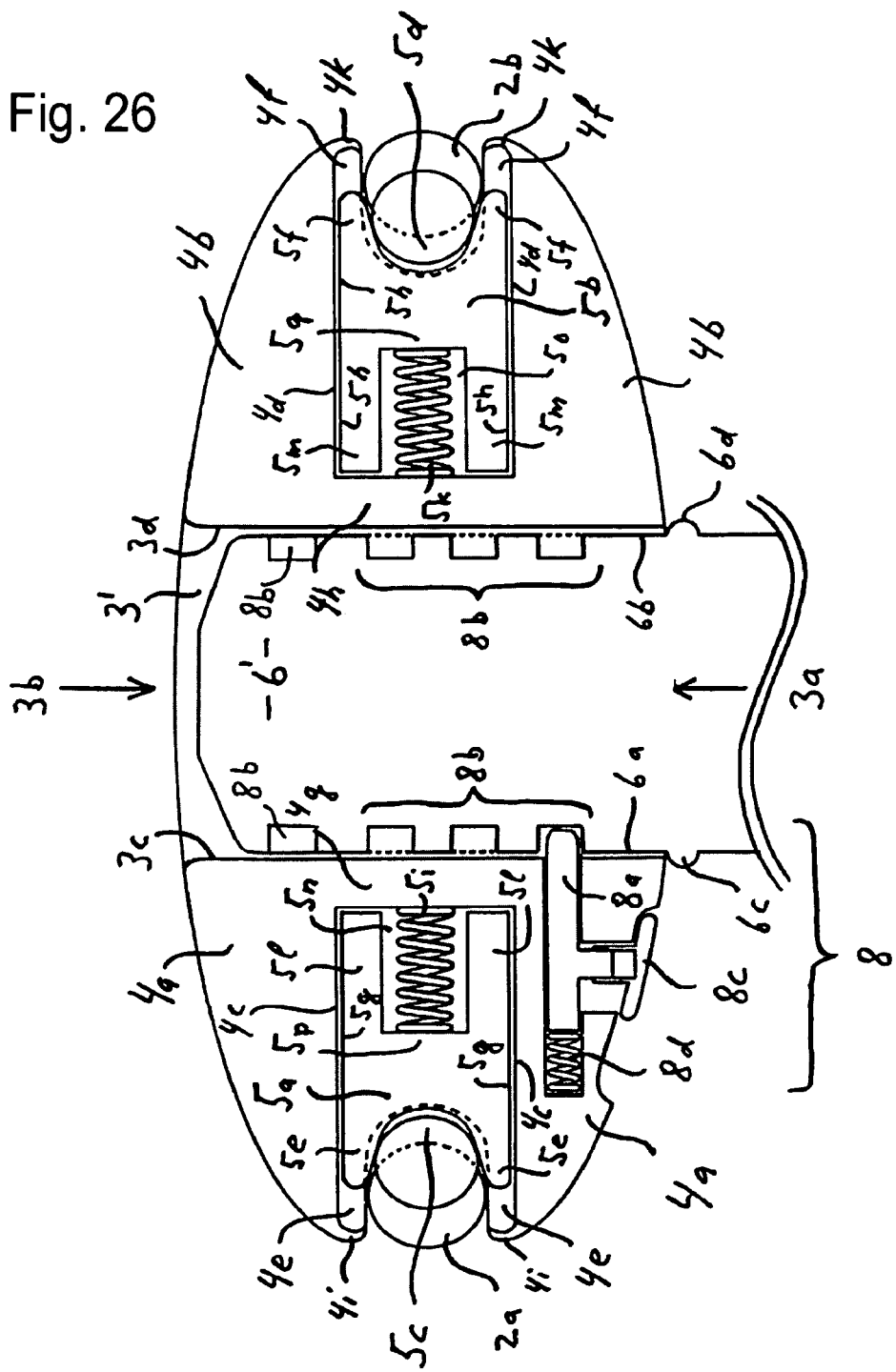
FIG. 26 shows a longitudinal section through the fastening unit according to FIG. 23 with the plug element in the receiving bushing.

A plurality of recesses 8*b* are arranged one behind another on side walls 6*a*, 6*b* of the plug element 6', and latch 8*a* can latch into said recesses under the action of latch spring 8*d*, and therefore the plug element 6' can be locked in different positions in the receiving bushing 3' (FIG. 26). The locking device 8 can be released by actuating member 8*c*, which is accessible on the outer wall 7*g* of the housing 7.

Figure 25:
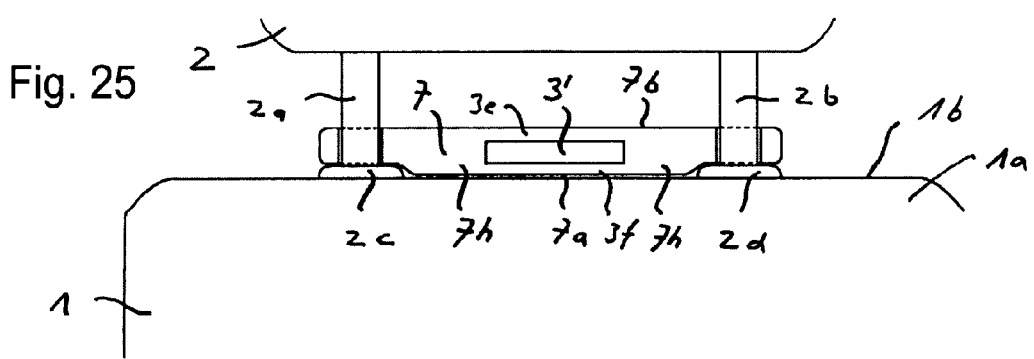
FIG. 25 shows a view of the fastening unit according to the invention according to FIG. 23 with a housing alternative, mounted on two headrest rods of a vehicle seat.

FIG. 25 shows an alternative of the design of housing 7. Rosettes 2*c*, 2*d*, in which headrest rods 2*a*, 2*b* are guided, are arranged on upper side 1*b* of backrest 1*a*. A protrusion 7*h* is arranged on that side of the housing 7 which is directed toward the upper side 1*b* of the backrest 1*a*, the protrusion extending between the rosettes 2*c*, 2*d* as far as the upper side 1*b* of the backrest 1*a*. A receiving bushing 3' is centered between a lower broad side 7*a* and an upper broad side 7*b* of the housing 7, and therefore top wall 3*e* and bottom wall 3*f* of the receiving bushing 3' have the same wall thicknesses.

Figure 27:
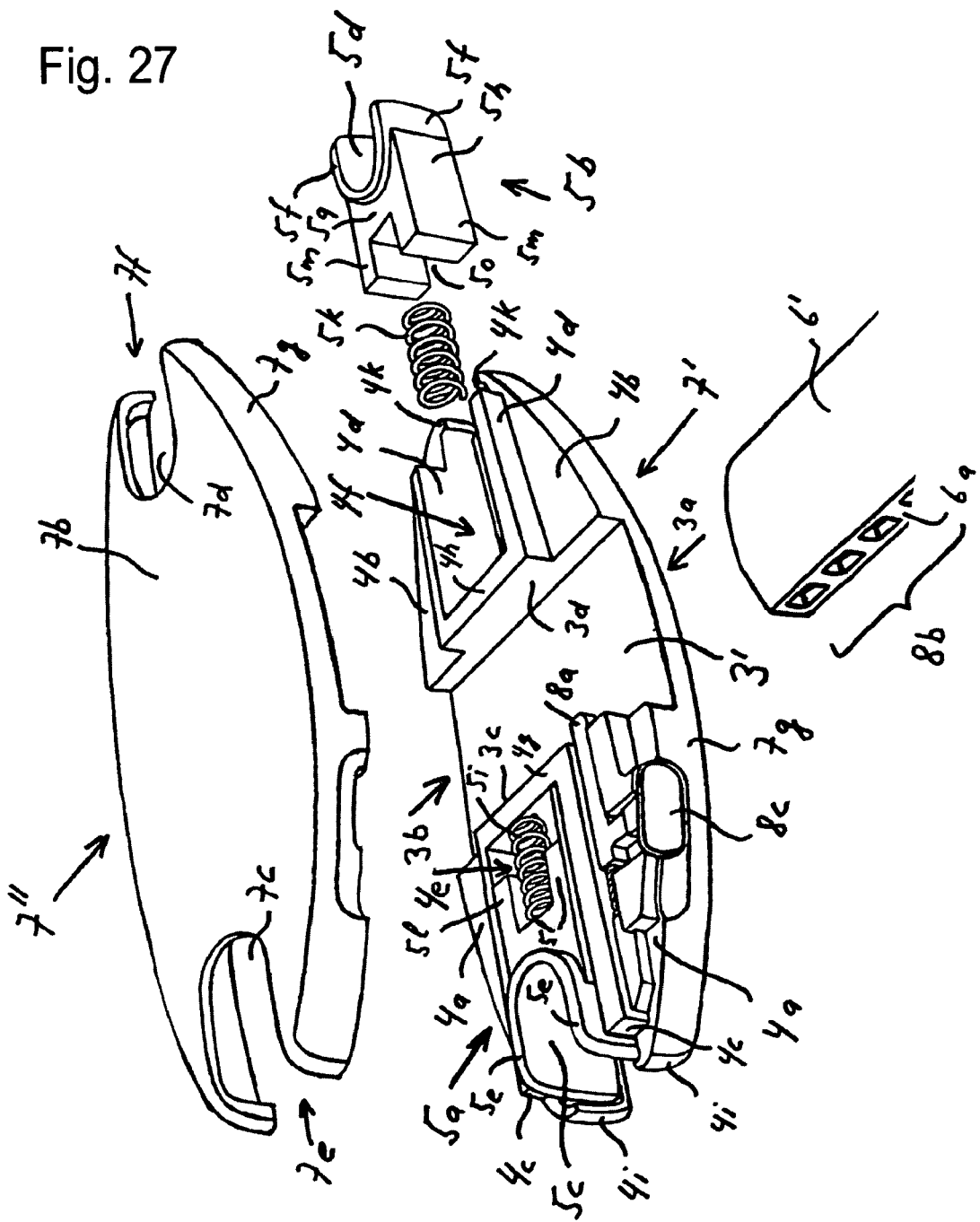
FIG. 27 shows an exploded illustration of the fastening unit according to FIG. 24.

FIGS. 26 and 27 show an inner construction of a fastening unit. Fastening element sections 4*a*, 4*b* are accommodated laterally next to receiving bushing 3' in housing 7. Guides 4*c*, 4*d* which form guide channels 4*e*, 4*f* for receiving clamping elements 5*a*, 5*b* are arranged on the fastening element sections 4*a*, 4*b*. Longitudinal axes of the receiving bushing 3' and guide channels 4*e*, 4*f* are arranged in a cross-shaped manner and are perpendicular to one another.

U-shaped forks 5*c*, 5*d*, limbs 5*e*, 5*f* of which are supported on headrest rods 2*a*, 2*b*, are arranged at those ends of the clamping elements 5*a*, 5*b* which are directed toward the headrest rods 2*a*, 2*b*.

Side walls 5*g*, 5*h* of the clamping elements 5*a*, 5*b* form the guides with which the clamping elements 5*a*, 5*b* are guided in the guide channels 4*e*, 4*f*. On the sides directed toward the receiving bushing 3', the guide channels 4e, 4f are closed by end walls 4g, 4h. On the sides directed toward the headrest rods 2a, 2b, the extension travels of the clamping elements 5a, 5b are limited by stops 4i, 4k.

Between guide struts 5l, 5m of the clamping elements 5a, 5b there are clearances 5n, 5o, in which pressure springs 5i, 5k are arranged, the pressure springs 5i, 5k being supported on the end walls 4g, 4h and pressing the clamping elements 5a, 5b on transverse walls 5p, 5q, which are arranged behind the forks 5c, 5d, in the direction of the headrest rods 2a, 2b.

The height of the limbs 5e, 5f of the forks 5c, 5d protrudes over the height of the clamping elements 5a, 5b at the bottom and top and corresponds to the outer height of the housing 7. Recesses 7c, 7d in lower and upper housing shells 7', 7" are dimensioned in such a manner that the collar-shaped excess length of the limbs 5e, 5f can move freely between the inner and outer end positions thereof.

A plug element 6' can be introduced into the receiving bushing 3' through the a first plug-in opening 3a or through the a second plug-in opening 3b. Recesses 8b, into which latch 8a of locking device 8 can latch in different plug-in depths, are arranged on side walls 6a, 6b of the plug element 6'. Stops 6c, 6d limit the plug-in depth of the plug element 6', and therefore the latter cannot protrude beyond the plug-in openings 3a, 3b.

The latch 8a is pressed by latch spring 8d into the recesses 8b in the plug element 6'. In order to release the locking device 8, the latch 8a can be moved out of the recesses 8b by means of actuating member 8c, which is arranged in side wall 7g next to the first plug-in opening 3a.

Figure 28:
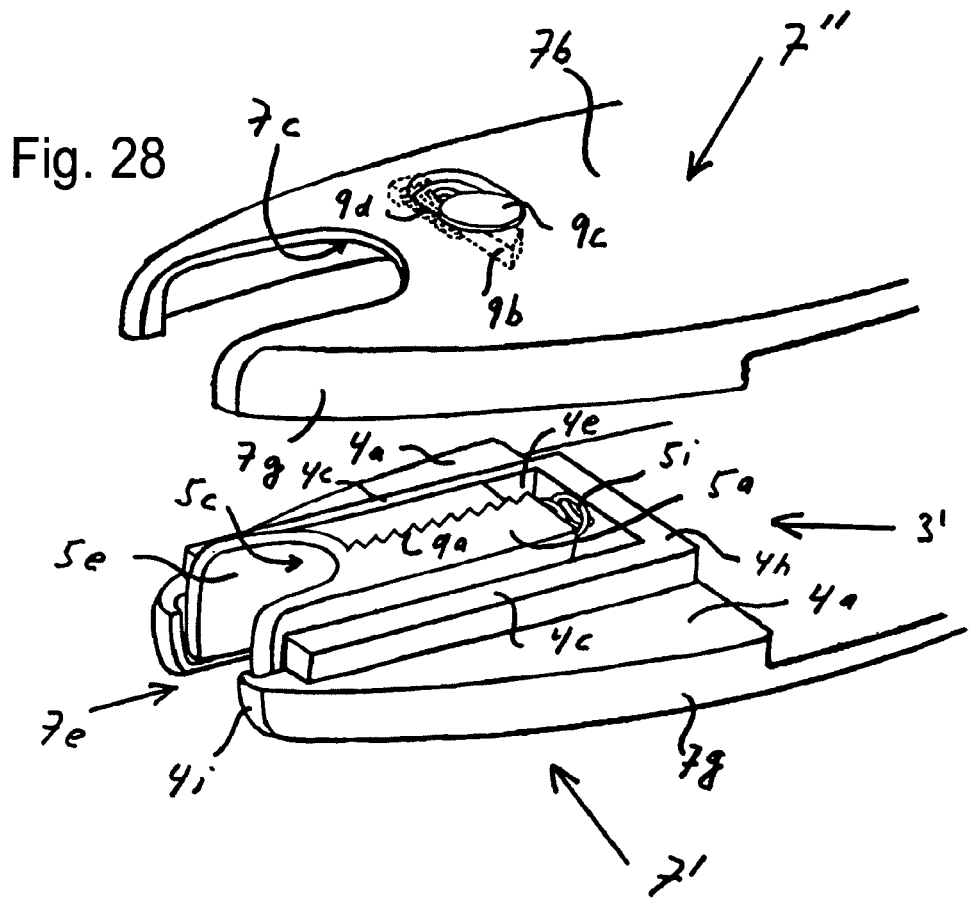
FIG. 28 shows a perspective partial view of an alternative of the fastening unit according to the invention according to FIG. 24 with the housing shells open.
Figure 29:
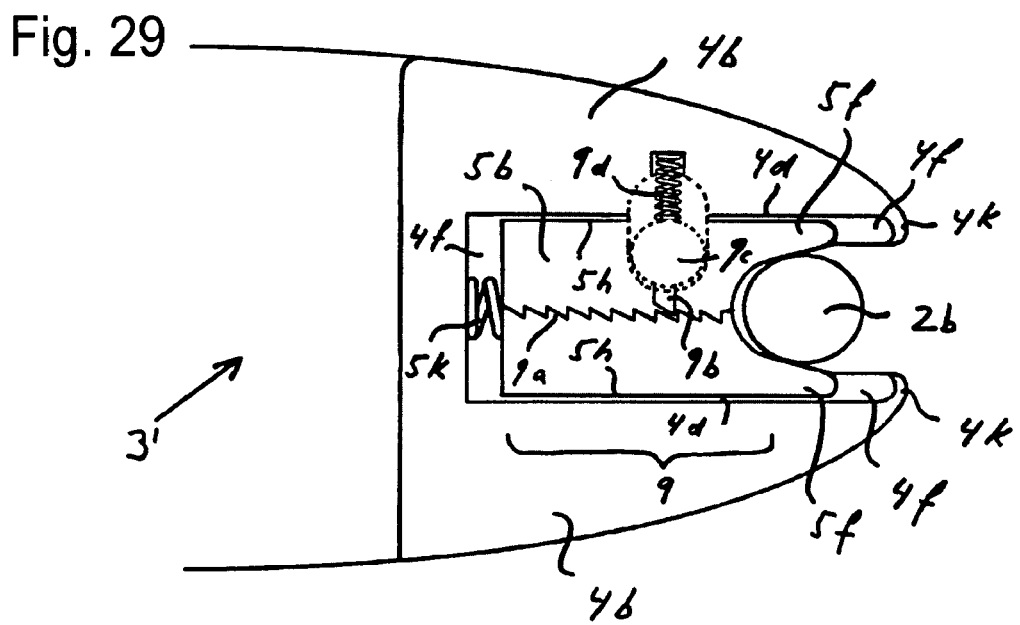
FIG. 29 shows a schematic longitudinal section of the fastening unit according to the invention according to FIG. 28 with a headrest rod.

FIGS. 28 and 29 show a latching device 9 with which clamping elements 5a, 5b can be blocked in housing 7. Racks 9a which extend parallel to the directions of movement of the clamping elements 5a, 5b are arranged on the upper side of the clamping elements 5a, 5b. Pawls 9b which are mounted movably transversely with respect to the direction of movement of the racks 9a and are kept in engagement with the racks 9a by latching springs 9d are arranged on upper housing shell 7". Teeth of the racks 9a and the pawls 9b are designed in such a manner that the clamping elements 5a, 5b can move freely in the direction of headrest rod 2a, 2b under the influence of pressure springs 5i, 5k, but are blocked in the direction of receiving bushing 3'. The pawls 9b can be brought out of engagement with the racks 9a by actuating elements 9c, and therefore the clamping elements 5a, 5b can be moved toward the receiving bushing 3'.

Figure 30:
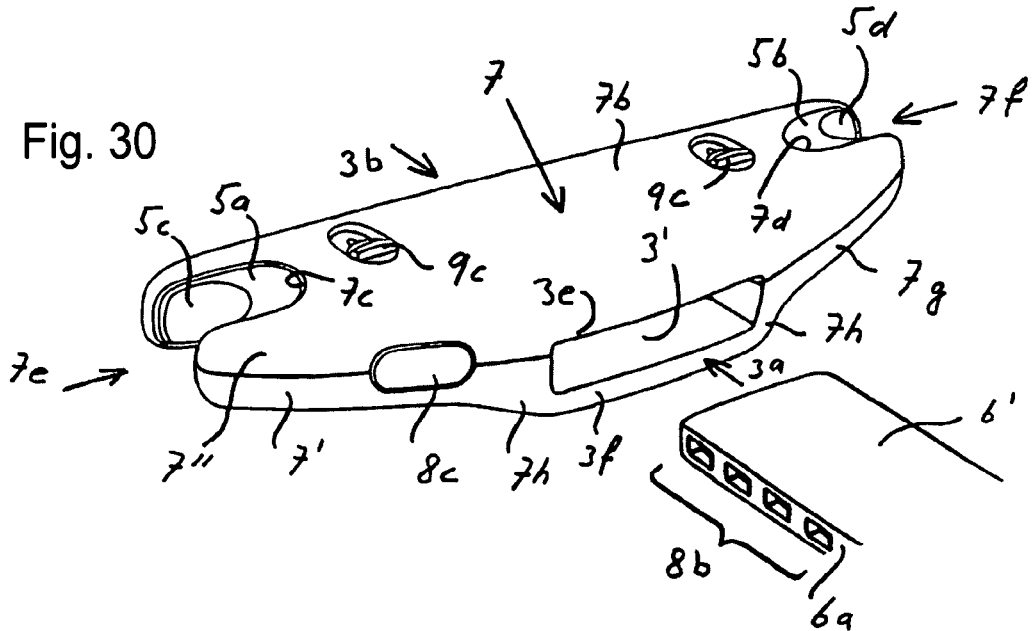
FIG. 30 shows a perspective view of a fifth alternative of the fastening unit according to the invention, mounted on two headrest rods, and a cut-away plug element.
Figure 31:
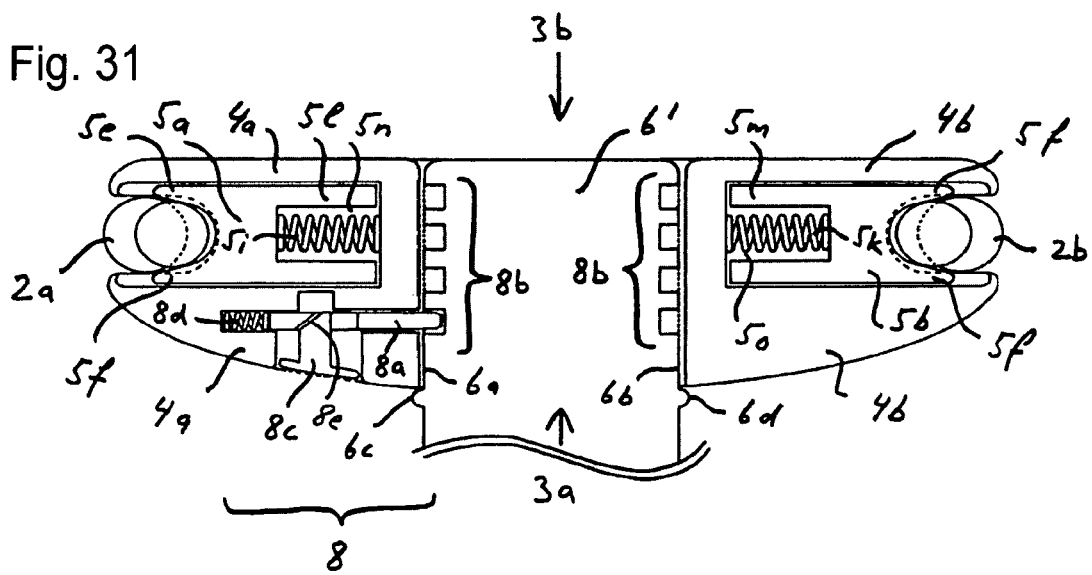
FIG. 31 shows a longitudinal section through the fastening unit according to FIG. 30 with the plug element in the receiving bushing and with two headrest rods.
Figure 32:
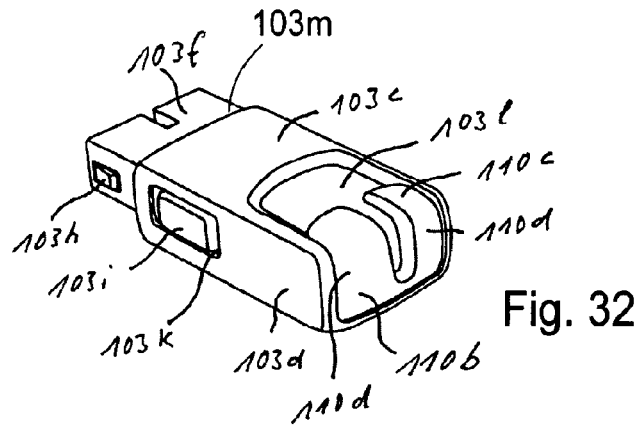
FIG. 32 shows a perspective view of a further alternative of the plug element with an integrated support arm in the non-use position.
Figure 33:
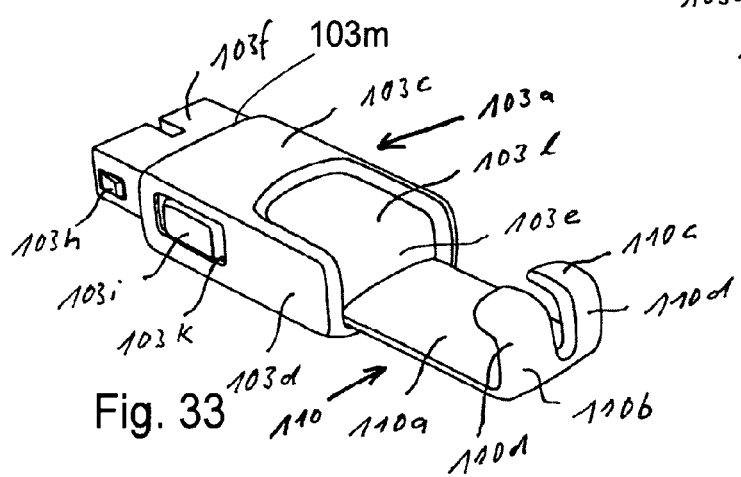
FIG. 33 shows a perspective view of the plug element according to FIG. 32 with the support arm in the use position.
Figure 34:
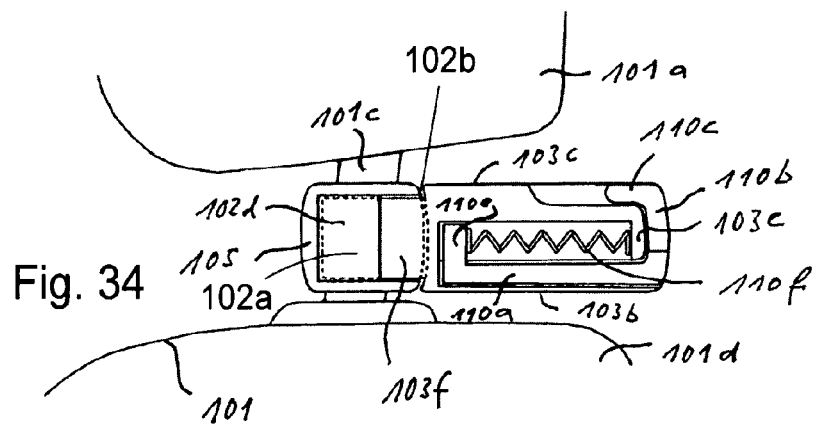
FIG. 34 shows a longitudinal section through the plug element according to FIG. 32 with the fastening unit, mounted on a vehicle seat.
Figure 35:
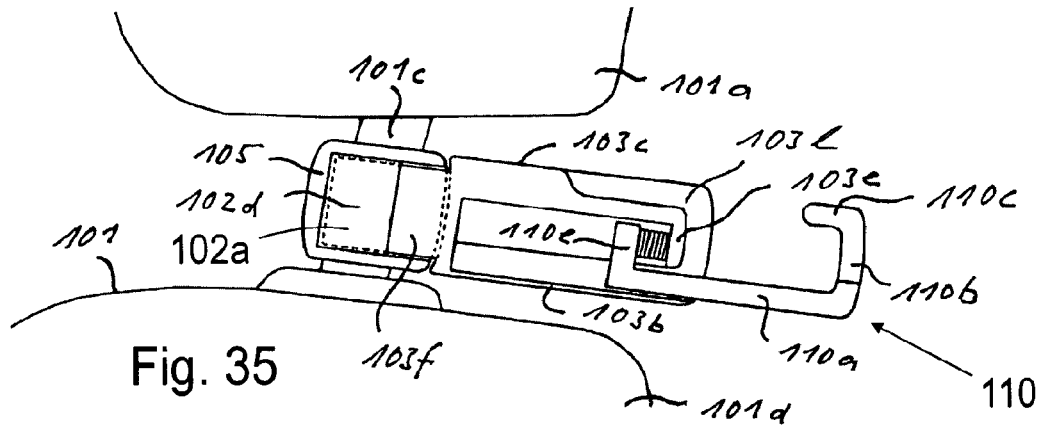
FIG. 35 shows a longitudinal section through the plug element according to FIG. 33 with the fastening unit, mounted on a vehicle seat.
Figure 36:
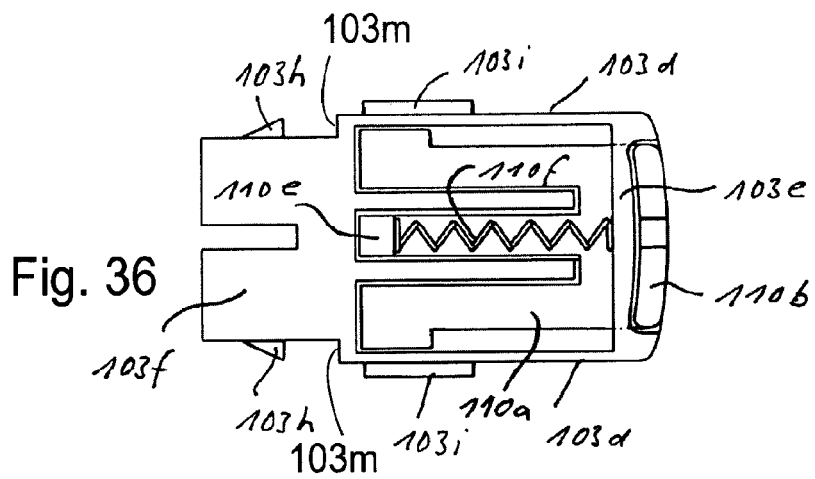
FIG. 36 shows a longitudinal section of the plug element according to FIG. 32 from above.
Figure 37:
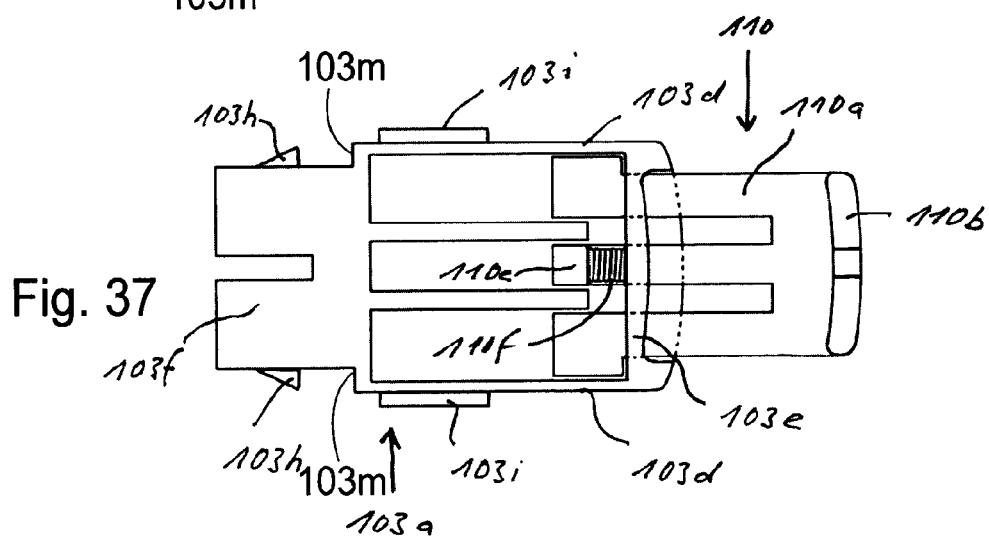
FIG. 37 shows a longitudinal section of the plug element according to FIG. 33 from above.
Figure 50:
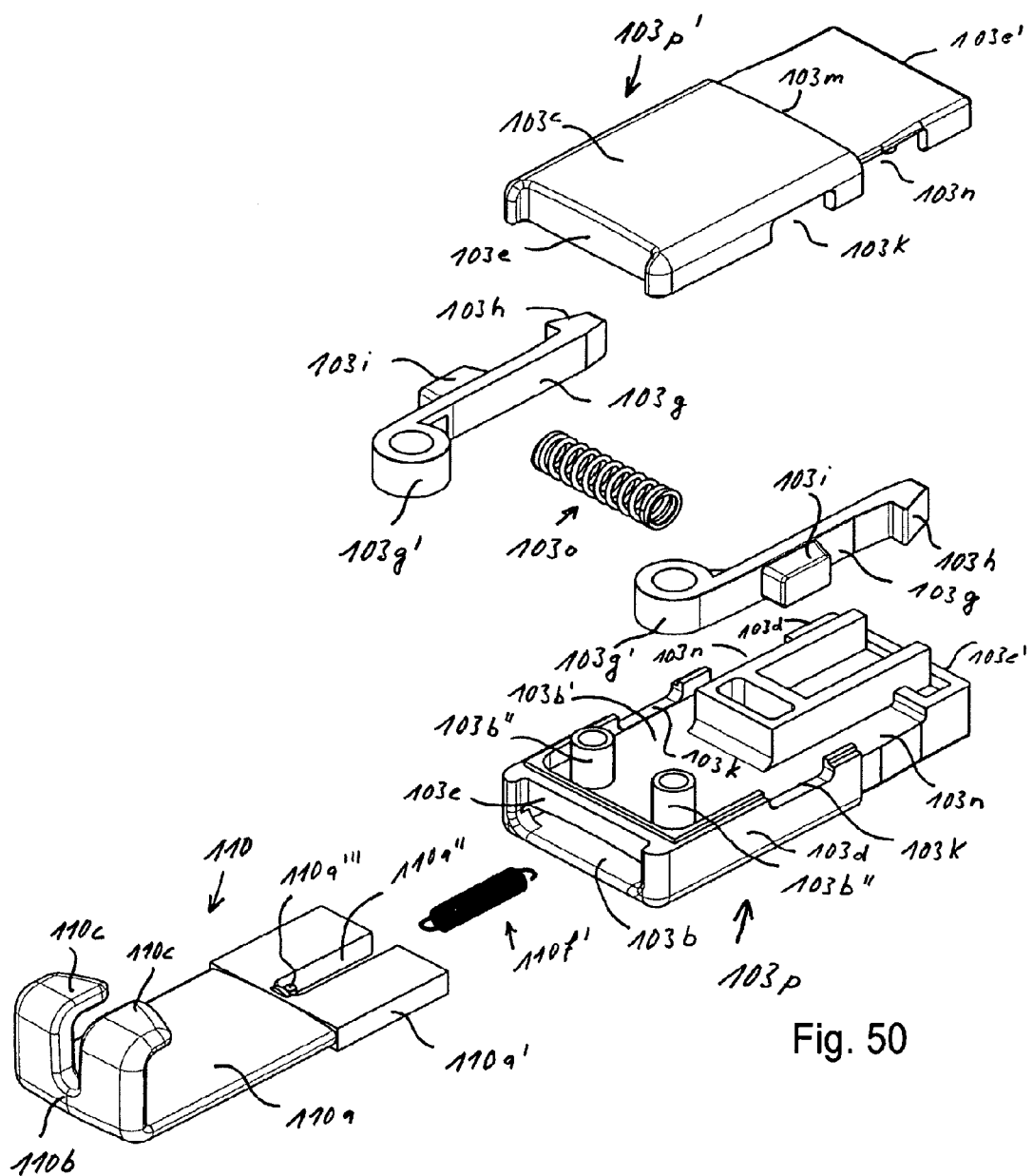
FIG. 50 shows an exploded illustration of the plug element according to FIGS. 42 to 50.

FIGS. 30 and 31 show a fifth alternative of the a fastening unit according to the invention. In this alternative, the shape of housing 7 is of asymmetrical configuration with respect to the position of rod openings 7e, 7f. The excess length of the housing 7 beyond headrest rods 2a, 2b is greater on the side of first plug-in opening 3a than on the side of plug-in opening 3b, and the contour of the housing 7 is curved convexly on the side of the plug-in opening 3a while said contour runs approximately parallel to a connecting plane of the headrest rods 2a, 2b on the side of the plug-in opening 3b. In the region of receiving bushing 3', a protrusion 7h is arranged on lower housing shell 7'. An actuating member 8c is designed as a pushbutton and is operatively connected to latch 8a via a slope 8e.

FIGS. 32 to 37 show a further alternative of the plug element 103a with an extendible support arm 110. The plug element 103a comprises a housing with bottom wall 103b, two side walls 103d, front wall 103e, top wall 103c and guide element 103f. The extendible support arm 110 is accommodated in the housing, which support arm is movable between a non-use position, in which it is substantially accommodated in the housing (FIGS. 32, 34, 36), and a use position (FIGS. 33, 35, 37), in which said support arm 110 protrudes beyond a backrest 101d of a vehicle seat 101 for the suspension of objects, for example bags, briefcases and clothes hangers.

The support arm 110 comprises a bottom wall 110a and an approximately vertically running end wall 110b, which is arranged at the front end of the bottom wall 110a and at the upper end of which a holding-down device 110c, which runs approximately parallel to the bottom wall 110a and is directed toward the plug element 103a, is arranged. The end wall 110b and the holding-down device 110c are slit in the center, and therefore two sections 110d can be used as clothes peg both in the use position and in the non-use position of the support arm 110.

The bottom wall 110a of the support arm 110 is guided in a linearly movable manner on the bottom wall 103b of the plug element 103a, wherein the direction of movement takes place parallel to the plug-in direction of the plug element 103a into a receiving bushing 102a.

A support element 110e is arranged at the rear end of the bottom wall 110a, wherein a pressure spring 110f which pretensions the support arm 110 into the non-use position and draws the support arm into the housing when not in use, is clamped between the front wall 103e of the plug element 103a and the support element 110e.

A trough-shaped depression 103l, in which the end wall 110b and the holding-down device 110c of the support arm 110 are accommodated in the non-use position, is formed on the outside of the front wall 103e and of the top wall 103c of the plug element 103a.

FIGS. 38 to 41 show yet another alternative of a plug element 103a. A support arm 110 is connected to a plug element 103a via a joint 110h, which is arranged at the rear end of a bottom wall 110a and has an axis of rotation 110i running substantially parallel to a connecting line 100, and is pretensioned by a leg spring 110g into the non-use position in which the support arm 110, with holding-down device 110c directed toward the plug element 103a, bears against a top wall 103c of the plug element 103a substantially congruently thereto (FIGS. 38 and 41). For use, the support arm 110 is unfolded into the use position (FIGS. 39 and 41) counter to the force of the leg spring 110g and is held in said position by the weight of suspended objects.

FIGS. 42 to 50 show yet another alternative of a plug element 103a with an integrated support arm 110. The plug element 103a comprises a housing lower part 103p with a bottom wall 103b, an intermediate bottom 103b' and parts of two side walls 103d, and with rear front wall 103e and front front wall 103e', and a cover 103p' with a top wall 103c and parts of the two side walls 103d, and with the rear front wall 103e and the front front wall 103e. The housing lower part 103p is of two-part design, with the separate bottom wall 103b, for better accessibility during the mounting.

The intermediate bottom 103b' divides the plug element 103a into two receiving spaces 103q, 103q' lying one above the other (FIG. 44). A linearly extendible support arm 110 with guide section 110a', and draw spring 110f for drawing the support arm 110 into the receiving space 103q are accommodated in the lower receiving space 103q, and locking mechanism 103g, 103g', 103h, 103i, 103o, 103b" of the plug element 103a is accommodated in the upper receiving space 103q'. Both the receiving spaces 103q, 103q' extend substantially over the entire length of the plug element 103a, including guide element 103f, which is plugged into receiving bushing 102a of the first fastening element 105. A long guide and extension length for the support arm 110 is thereby made available without the length of the plug element 103a having to be increased beyond the length necessary for the locking mechanism 103g, 103g', 103h, 103i, 103o, 103b".

The support arm 110 is movable between a non-use position, on which it is substantially accommodated in the receiving space 103q (FIGS. 44 45, 47), and a use position (FIGS. 42, 43, 46), in which it protrudes beyond a backrest 101d of a vehicle seat 101 for the suspension of objects, for example bags, briefcases and clothes hangers.

The support arm 110 comprises a bottom wall 110a with the guide section 110a' at the rear end of the bottom wall 110a, and an approximately vertically running end wall 110b, which is arranged at the front end of the bottom wall 110a and at the upper end of which a holding-down device 110c, which runs approximately parallel to the bottom wall 110a and is directed toward the plug element 103a, is arranged. The end wall 110b and the holding-down device 110c are slit in the center such that two sections 110d can be used as clothes peg both in the use position and in the non-use position of the support arm 110.

The bottom wall 110a of the support arm 110 is guided in a linearly movable manner on the bottom wall 103b of the plug element 103a by the guide section 110a', which also forms the end stop for limiting the extension travel, wherein the direction of movement takes place parallel to the plug-in direction of the plug element 103a into the receiving bushing 102a.

A cutout spring opening 110a" is provided in the center of the guide section 110a and has a first spring suspension means 110a'" on which one end of the draw spring 110f is secured. The other end of which is secured on a second spring suspension means 103b'" arranged on the intermediate bottom 103b'. When not in use, the draw spring draws the support arm 110 back into the receiving space 103q.

The locking mechanism 103g, 103g', 103h, 103i, 103o, 103b" of the plug element 103a, which locking mechanism is accommodated in the upper receiving space 103q', comprises the two spring arms 103g, at the rear ends of which bearing eyes 103g' are arranged, with which the spring arms 103g are mounted rotatably on journals 103b" arranged on the intermediate bottom 103b'.

Latching hooks 103h which protrude outward through apertures 103n in the side walls 103d are arranged at the front ends of spring arms 103g. Actuating members 103i, which protrude outward through pushbutton openings 103k in the side walls 103d, are arranged on the spring arms 103g approximately centrally between the latching hooks 103h and bearing eyes 103g'.

Locking spring 103o is clamped between the two spring arms 103g, the locking spring pressing the spring arms 103g against the side walls 103d which form the stops. By the two actuating members 103i being pressed together, the latching hooks 103h are moved inward and the locking mechanism is released.

We claim:

1. A fastening unit for connecting a device to two spaced-apart headrest rods of a vehicle seat, the fastening unit comprising:
   a second coupling element, the second coupling element being arranged or arrangeable on the device;
   a first coupling element, the first coupling element structured to receive the second coupling element;
   a first fastening element arranged on the first coupling element;
   a second fastening element connected movably to the first fastening element, wherein by means of these first and second fastening elements, the first coupling element can be fastened to headrest rods, wherein, when the device is attached to the headrest rods, the first fastening element and the second fastening element are supported on the headrest rods and are movable relative to each other, parallel to a connecting line running approximately horizontally between centers of the headrest rods;
   a latching device by means of which relative movement between the first and the second fastening elements can be blocked such that movement of the first and second fastening elements in a direction of the headrest rods is permitted and movement of the first and second fastening elements away from the headrest rods is blocked, wherein the latching device is designed as a latching mechanism having a rack with a serration and having a spring-loaded pawl in engagement with the rack, the rack being arranged on the first fastening element and the pawl being arranged on the second fastening element; and
   an actuating element disposed on the second fastening element, the actuating element structured to release the latching device in order to move the fastening elements away from the headrest rods, wherein the latching device pawl can be brought out of engagement with the latching device rack by means of the actuating element, the actuating element being designed as a sliding switch disposed on an upper wall of the second fastening element, wherein a housing recess through which the actuating element protrudes is disposed in that upper wall.

2. The fastening unit as claimed in claim 1, wherein the first coupling element is designed as a receiving bushing and the second coupling element is designed as a plug element, wherein the receiving bushing is arranged in an interior of the first fastening element and is provided with an opening which is arranged on a side wall of the first fastening element opposite to the rear side wall thereof and structured for insertion of the plug element, wherein the rack is arranged on the upper wall or on the rear side wall of the first fastening element.

3. The fastening unit as claimed in claim 2, wherein a tension spring is clamped between the first fastening element and the second fastening element, the tension spring pressing the first and second fastening elements apart in a direction toward the two headrest rods.

4. The fastening unit as claimed in claim 2, further comprising a manually releasable locking device with which the plug element can be locked in the receiving bushing, wherein a guide element which is received by the receiving bushing is arranged on the plug element, and wherein the guide element has a step which is supported on a wall to a side of the opening, wherein spring arms are arranged on both sides of the guide element, with outwardly directed latching hooks being located at front ends of the spring arms, the latching hooks hooking into recesses which are arranged on side walls of the receiving bushing, wherein outwardly directed actuating members are arranged on the two spring arms, the actuating members protruding through pushbutton openings on two side walls of the plug element and being able to be used to press the spring arms toward each other in order to release the latching hooks, wherein the spring arms are connected at rear ends thereof to the plug element via joints and are pressed apart from each other by a locking spring.

5. The fastening unit as claimed in claim 2, wherein the receiving bushing and the first and the second fastening element are arranged laterally next to one another and are approximately identical in height.

* * * * *